(12) United States Patent
Gao et al.

(10) Patent No.: US 12,459,619 B2
(45) Date of Patent: Nov. 4, 2025

(54) TRIM DEVICE AND CONTROL METHOD THEREOF, WATER PROPELLER, WATER-MOBILE DEVICE, AND MEDIUM

(71) Applicant: GUANGDONG EPROPULSION TECHNOLOGY LIMITED, Dongguan (CN)

(72) Inventors: Qihao Gao, Dongguan (CN); Shizheng Tao, Dongguan (CN); Xiaokang Wan, Dongguan (CN)

(73) Assignee: GUANGDONG EPROPULSION TECHNOLOGY LIMITED, Dongguan (CN)

( * ) Notice: Subject to any disclaimer, the term of this patent is extended or adjusted under 35 U.S.C. 154(b) by 0 days.

(21) Appl. No.: 19/188,008

(22) Filed: Apr. 24, 2025

(65) Prior Publication Data

US 2025/0249995 A1     Aug. 7, 2025

Related U.S. Application Data

(63) Continuation of application No. PCT/CN2023/085124, filed on Mar. 30, 2023.

(51) Int. Cl.
*B63H 20/10* (2006.01)
(52) U.S. Cl.
CPC .................. *B63H 20/10* (2013.01)

(58) Field of Classification Search
CPC ....................................... B63H 20/10
See application file for complete search history.

(56) References Cited

U.S. PATENT DOCUMENTS

| | | | |
|---|---|---|---|
| 2016/0375973 A1* | 12/2016 | Andrasko | G05D 1/0875 440/1 |
| 2019/0071160 A1* | 3/2019 | Bylsma | B63H 20/10 |
| 2025/0019057 A1* | 1/2025 | Kato | B63H 20/10 |

OTHER PUBLICATIONS

International Search Report issued in corresponding International Application No. PCT/CN2023/085124, mailed Nov. 6, 2023, 18 pages.
Registration Procedure Notice issued in corresponding Chinese Application No. 202380009274.4, mailed Feb. 26, 2024, 8 pages.

* cited by examiner

*Primary Examiner* — Stephen P Avila
(74) *Attorney, Agent, or Firm* — BAYES PLLC

(57) ABSTRACT

A trim device and a control method thereof, a water propeller, water mobile device and a medium, are provided. The control method comprises: controlling the trim device to trim up and obtaining a trim angle of the trim device when receiving a trim-up command. When the trim angle reaches an entry angle, maintaining a trim-up state of the trim device until the trim angle reaches a limit angle. The limit angle is greater than the entry angle, and the trim device is in a limit protection mode when the trim angle reaches the limit angle.

20 Claims, 23 Drawing Sheets

TRIM DEVICE AND CONTROL METHOD THEREOF, WATER PROPELLER, WATER-MOBILE DEVICE, AND MEDIUM

CROSS-REFERENCE TO RELATED APPLICATION

This application is a continuation of International Application No. PCT/CN2023/085124, filed on Mar. 30, 2023. The entire contents of the above-referenced application are expressly incorporated herein by reference.

TECHNICAL FIELD

The disclosure relates to the technical field of boats, in particular to a trim device and control method thereof, water propeller, water-mobile device, and medium.

TECHNICAL BACKGROUND

The trim device of the water propeller generally has a limit protection function, and the position of the trim device can be limited after the trim device trims to a certain height, so that the trim device is kept at the height. In the related art, it is necessary to manually control the trim device so that the trim device enters or exits a limit protection mode. However, the operation complexity of manual control is relatively high.

SUMMARY

The embodiments of the present disclosure provide a control method of a trim device. The control method includes:
controlling the trim device to trim up and obtaining a trim angle of the trim device when receiving a trim-up command; and
maintaining a trim-up state of the trim device until the trim angle reaches a limit angle when the trim angle reaches an entry angle, wherein the limit angle is greater than the entry angle, and the trim device is in a limit protection mode when the trim angle reaches the limit angle.

The embodiments of the present disclosure provide a trim device. The trim device includes:
a processor; and
a memory, wherein the memory is configured to store a program, and the program is executed by the processor to realize the control method of the trim device according to any embodiment of the present disclosure.

The embodiments of the present disclosure provide a water propeller. The water propeller includes a main unit and a trim device connected to the main unit. The trim device includes:
a memory storing computer-readable instructions; and
a processor coupled to the memory and configured to execute the computer-readable instructions, wherein the computer-readable instructions, when executed by the processor, cause the processor to perform operations comprising:
controlling the trim device to trim up and obtaining a trim angle of the trim device when receiving a trim-up command; and
when the trim angle reaches an entry angle, maintaining a trim-up state of the trim device until the trim angle reaches a limit angle, wherein the limit angle is greater than the entry angle, and the trim device is in a limit protection mode when the trim angle reaches the limit angle.

The embodiments of the present disclosure provide a water-mobile device. The water-mobile device includes:
a movable body; and
the water propeller according to any embodiment of the present disclosure is mounted to the movable body.

The embodiments of the present disclosure provide a computer-readable storage medium having a computer program stored thereon. The computer program is executed by a processor to realize the control method of the trim device according to any embodiment of the present disclosure.

According to the embodiments of the present disclosure, when the trim-up command is received, the trim device can be automatically controlled to trim up by detecting the trim angle, and when the trim angle of the trim device reaches an entry angle, the trim device can be controlled to maintain trim up until the trim angle of the trim device reaches a limit angle at which the trim device enters a limit protection mode. The above process reduces the user operation and reduces the operation complexity of the control mode. In addition, in the manual operation process of a user, there is a situation in which the trim device has not entered the limit protection mode, but the user mistakenly thinks that the trim device has entered the limit protection mode. By adopting the embodiments of the present disclosure, the trim-up state of the trim device can be maintained until the trim angle of the trim device reaches the limit angle. The trim device is in the limit protection mode when the trim angle of the trim device reaches the limit angle, so that the misjudgment in the manual operation process described above can be avoided, the trim device can enter the limit protection mode, and the safety is improved.

BRIEF DESCRIPTION OF DRAWINGS

In order to more clearly illustrate the technical solutions in the embodiments of the present disclosure, the following will briefly introduce the drawings used in the embodiments or the description of the related art. Obviously, the drawings in the following description are only some embodiments of the present disclosure. For those of ordinary skill in the art, other figures may also be obtained from these figures without creative effort.

DETAILED DESCRIPTION

Figure 1:
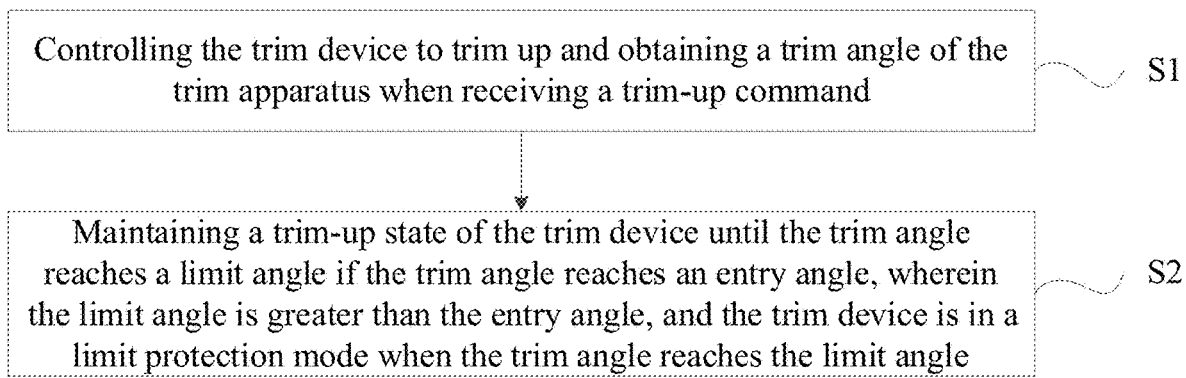
FIG. 1 is a flow chart of a control method of a trim device according to some embodiments of the present disclosure.

Reference will now be made in detail to exemplary embodiments, examples of which are illustrated in the accompanying drawings. When the following description refers to the drawings, the same numbers in different drawings indicate the same or similar elements, unless otherwise indicated. The embodiments described in the following exemplary embodiments are not intended to represent all embodiments consistent with this disclosure. Rather, they are merely examples of device and methods consistent with some aspects of the disclosure as detailed in the appended claims.

The terminology used in this disclosure is for the purpose of describing particular embodiments only and is not intended to be limiting this disclosure. As used in this disclosure and the appended claims, the singular forms "a," "an," "said," and "the" are intended to include the plural forms as well, unless the context clearly dictates otherwise. It should also be understood that the term "and/or" as used herein refers to and encompasses any and all possible combinations of one or more of the associated listed items.

It should be understood that, although the terms first, second, third, etc. may be employed in this disclosure to describe various information, the information should not be limited to these terms. These terms are used only to distinguish one type of information from another. For example, the first information may also be referred to as the second information, and similarly, the second information may also be referred to as the first information, without departing from the scope of this disclosure. Depending on the context, the word "if" as used herein may be interpreted to mean "at . . . ," or "when . . . ," or "in response to a determination."

In the related art, the trim device of the water propeller can trim up to trim the water propeller to a certain height. As the water propeller is relatively heavy, after the trim device trims to a certain height, the trim device may suddenly fall under the influence of the gravity of the water propeller, thereby causing certain danger. Therefore, it is necessary to set a limit mechanism for the trim device. After the trimming of the trim device reaches a certain height, the limit mechanism can enter a limit position, so that the trim device enters the limit protection mode and is kept at the certain height. In the related art, the trim device is generally controlled by a manual control mode so as to enable the trim device to enter or exit the limit protection mode. However, the operation complexity of manual control mode is relatively high, including the following reasons.

(1) During the process of trimming up the trim device, the user usually needs to continue to manually control the trim device until the limit mechanism enters the limit position.

(2) After the limit mechanism enters the limit position, the trim device needs to exit the limit protection mode before normal trimming control. However, the user may not be aware of this when operating, which eventually causes the trim device to be stuck at the limit mechanism, which may cause physical damage to the limit mechanism.

In addition to the above problems, the manual control mode also has the problem of low control accuracy. For example, it is often difficult for the user to accurately judge whether the limit mechanism enters the limit position or not in the trim-up process of the trim device, and the user may stop controlling the trim device to trim up under the condition that the limit mechanism fails to enter the limit position, thereby increasing the risk that the trim device suddenly falls. For another example, when the limit mechanism is in the limit position, the user may misjudge that the trim device has exited the limiting protection mode when operating the trim device, and then directly perform normal trimming control, thereby increasing the risk of causing physical damage to the limit mechanism.

Based on this, the embodiments of the present disclosure provide a control method of a trim device. Referring to FIG. 1, the control method includes:

Step S1: controlling the trim device to trim up and obtaining a trim angle of the trim device when receiving a trim-up command; and maintaining a trim-up state of the trim device until the trim angle reaches a limit angle when the trim angle reaches an entry angle, wherein the limit angle is greater than the entry angle, and the trim device is in a limit protection mode when the trim angle reaches the limit angle.

In step S1, a user may send a trim-up command to the trim device. For example, an interactive component (e.g., a button, a touch screen, or an operating handle) in communication connection with the trim device may be provided, and the user may input a trim-up command through the interactive component. The trim device may continue trimming up after receiving the trim-up command. The trim device can also be provided with a sensor assembly for detecting and outputting the trim angle of the trim device in real time.

In step S2, the entry angle may be determined based on the angle at which the trim device enters the limit protection mode. In some embodiments, the entry angle may be equal to the angle at which the trim device enters the limit protection mode. In other embodiments, the entry angle may be determined based on the angle at which the trim device enters the limit protection mode and a first preset angle margin, and the entry angle is smaller than the angle at which the trim device enters the limit protection mode. In a non-limiting embodiment, the difference between the angle at which the trim device enters the limit protection mode and the first preset angle margin may be determined as the entry angle. By setting the first preset angle margin, the situation that the angle fed back by the sensor assembly indicates that the trim device has not reached the angle when entering the limit protection mode but actually the trim device has entered the limit protection mode when the user operates can be reduced.

For example, assume that the trim device enters the limit protection mode when the trim angle of the trim device reaches 60°. Since the detection result of the sensor assembly may have an error, when the actual trim angle of the trim device has reached 60°, the angle fed back by the sensor assembly may only be 55°. When the entry angle is set to 60°, the processor may mistakenly determine that the trim device has not reached the entry angle. Therefore, the entry angle can be set to be smaller than the angle (e.g., 55°) at which the trim device enters the limit protection mode, thus reducing the misjudgment and improving the control accuracy of the trim device.

In some embodiments, the first preset angle margin may be determined based on a difference between the angle at which the trim device enters the limit protection mode and an angle at which the trim device exits the limit protection mode. For example, the first preset angle margin may be positively correlated with the difference and not greater than the difference. In other embodiments, the first preset angle margin may also be determined according to the detection accuracy of the sensor assembly. For example, the higher the detection accuracy of the sensor assembly is, the smaller the first preset angle margin may be set, conversely the lower the detection accuracy of the sensor assembly is, the larger the first preset angle margin may be set. In practical applications, the first preset angle margin may be determined by combining the difference and the detection accuracy of the sensor assembly, or may be determined based on at least one of the difference and the detection accuracy of the sensor assembly together with other factors. The present disclosure will not list these methods one by one.

When the trim angle reaches the entry angle, the trim-up state of the trim device can be maintained until the trim angle of the trim device reaches the limit angle. Wherein the limit angle is larger than the entry angle, and the trim device is in a limit protection mode when the trim angle reaches the limit angle.

Figure 2A:
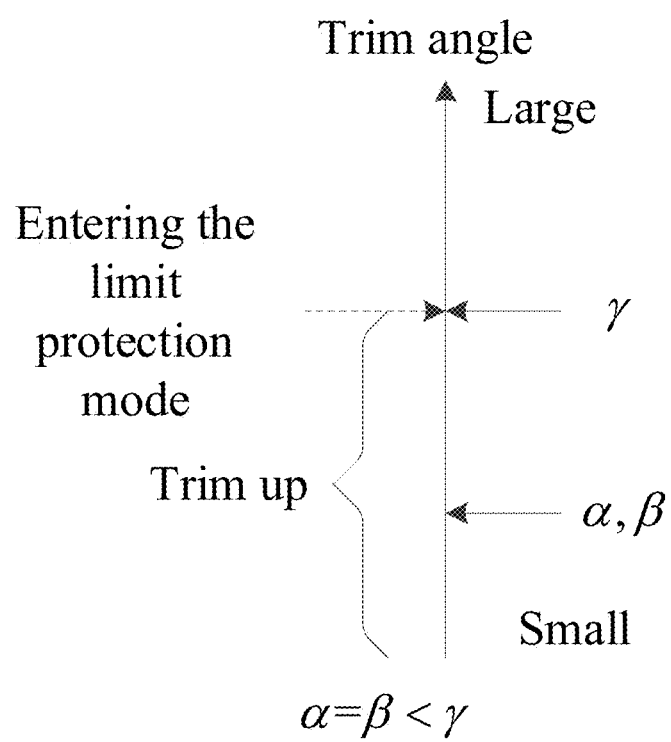
FIG. 2A, FIG. 2B, FIG. 2C, and FIG. 4 are schematic diagrams of various trim angles according to some embodiments of the present disclosure, respectively.
Figure 2B:
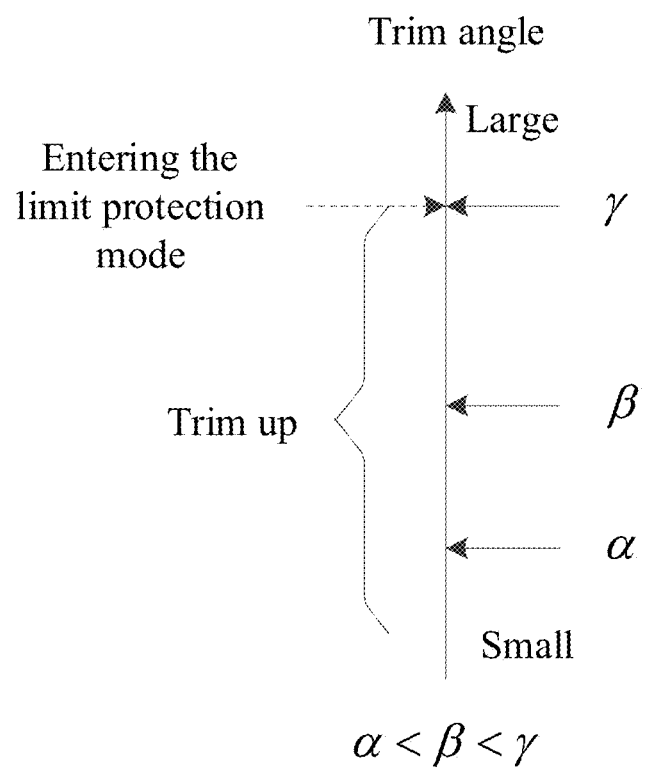
Figure 2C:
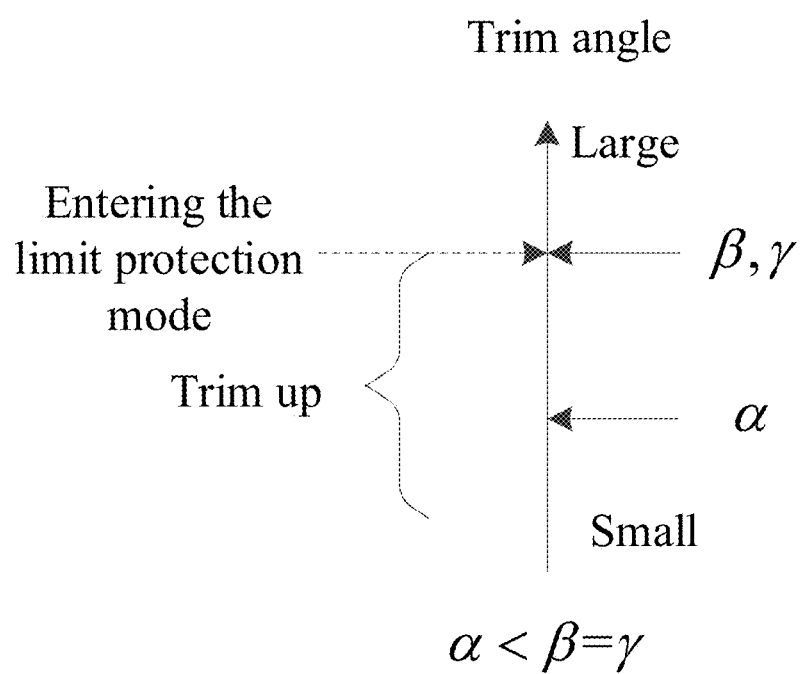

FIG. 2A, FIG. 2B, and FIG. 2C are schematic diagrams showing different situations of the entry angle $\alpha$, the angle $\beta$ at which the trim device enters the limit protection mode, and the limit angle $\gamma$, respectively. As shown in FIG. 2A, where the entry angle is equal to the angle at which the trim device enters the limit protection mode, the limit angle may be greater than the angle at which the trim device enters the limit protection mode. As shown in FIG. 2B and FIG. 2C, in the case that the entry angle is smaller than the angle at which the trim device enters the limit protection mode, the limit angle may also be greater than or equal to the angle at which the trim device enters the limit protection mode.

In some embodiments, the limit angle is determined based on the angle at which the trim device enters the limit protection mode and a second preset angle margin, and the limit angle is greater than the angle at which the trim device enters the limit protection mode. In a non-limiting embodiment, the sum of the angle at which the trim device enters the limit protection mode and the second preset angle margin may be determined as the limit angle. By setting the second preset angle margin, the situation that the angle fed back by the sensor assembly indicates that the trim device enters the limit protection mode but the trim device actually does not enter the limit protection mode when the user operates can be reduced.

For example, assume that the trim device enters the limit protection mode when the trim angle of the trim device reaches 60°. Due to the error in the detection result of the sensor assembly, when the actual trim angle of the trim device has not reached 60°, the angle fed back by the sensor assembly may have reached 60°. In this way, the processor may mistakenly determine that the trim device is already in the limit protection mode, so that the upward trim-up state of the trim device is no longer maintained, failing the trim device to enter the limit protection mode. Therefore, the limit angle can be greater than the angle at which the trim device enters the limit protection mode (e.g., 63°.), thereby improving the control accuracy of the trim device.

In the above embodiment, the first preset angle margin and the second preset angle margin may be the same or different. The second preset angle margin may also be determined according to the detection accuracy of the sensor assembly and/or the difference between the angle at which the trim device enters the limit protection mode and the angle at which the trim device exits the limit protection mode. The specific determination method of the second preset angle margin can be referred to as the determination method of the first preset angle margin, which is not described here.

In the above embodiment, the angle range between the entry angle and the limit angle may be referred to as a limit interval. When the trim angle is within the limit interval, the trim device is in the limit protection mode. The entry angle is the minimum angle of the limit interval, and the limit angle is the maximum angle of the limit interval.

In the above embodiment, the user only needs to input the trim-up command. When the processor receives the trim-up command, the processor can control the trim device to trim up and automatically control the trim-up process of the trim device based on the trim angle of the trim device until the trim angle of the trim device reaches the limit angle at which the trim device enters the limit protection mode. The above process reduces the user's operations and reduces the complexity of the operation. Meanwhile, the situation in which the user mistakenly thinks that the trim device enters the limit protection mode but actually does not enter the limit protection mode can be avoided, and safety can be improved.

Figure 3:
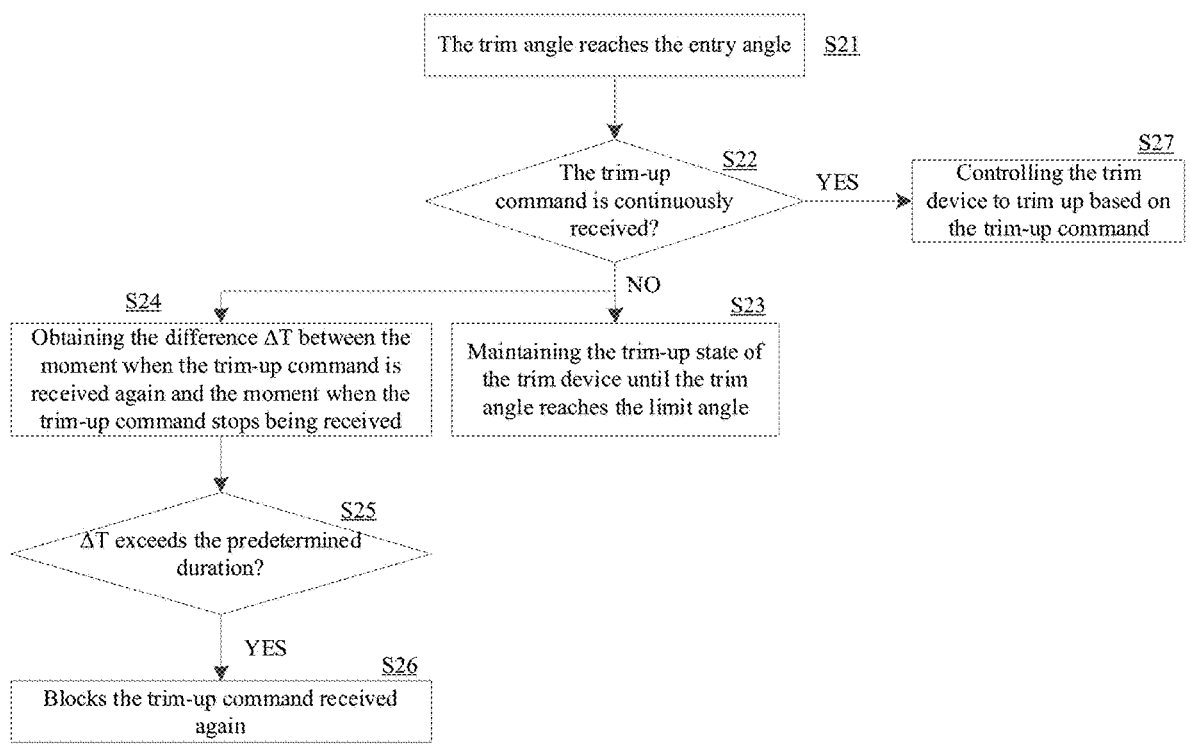
FIG. 3 is a flow chart of a specific control manner after the trim angle reaches an entry angle in the embodiments of the present disclosure.

In some embodiments, referring to FIG. 3, the control method according to the embodiments of the present disclosure further includes: when the trim angle reaches the entry angle (step S21), detecting whether the trim-up command is continuously received (step S22), and when the trim-up command is not received continuously, executing the step of maintaining the trim-up state of the trim device until the trim angle reaches the limit angle (step S23). The above-mentioned continuous receipt of the trim-up command may mean that the trim-up command received in step S1 is in a constant sending state, and the constant sending state of the trim-up command is maintained until the trim angle reaches the entry angle. In some embodiments, The continuous receipt of the trim-up command may also mean that the trim-up command is received again within a predetermined duration starting from when the upward tilting instruction in Step S1 stops being sent. Assuming that the moment when the trim-up command in step S1 stops being sent is T1, the moment when the trim-up command is received again is T2, and the predetermined duration is ΔT, then T2−T1≤ΔT represents the situation of continuously receiving the trim-up.

In this embodiment, when the trim angle reaches the entry angle, the user does not need to continue to input the trim-up command, and the processor can actively maintain the trim-up state of the trim device (referred to as active maintenance of trimming). Therefore, the user operation is reduced, and the operation complexity of the control process of the trim device is further reduced. In addition, in the traditional manual control mode, the user may mistakenly determine that the trim device has entered the limit protection mode before the trim device reaches the angle at which the trim device enters the limit protection mode, so as to stop inputting the trim-up command, thereby causing the trim device to fail to enter the limit protection mode. In this embodiment, when the trim angle reaches the entry angle, the processor can still actively maintain the trim process even when it fails to continue to receive the trim-up command. Therefore, the success rate of the trim device entering the limit protection mode is improved.

Furthermore, the control method of the embodiments of the present disclosure further includes: when the trim angle reaches the entry angle, when the trim-up command is not continuously received, the difference ΔT between the moment T2 when the trim-up command is received again and the moment T1 when the trim-up command stops being received may be obtained (step S24), and it is determined whether the ΔT exceeds the predetermined duration (step S25). When the ΔT exceeds the predetermined duration, the trim-up command received again may be shielded (step S26). After the trim angle of the trim device reaches the limit angle, the trim device will release the limit and then exit the limit protection mode. Therefore, by blocks the trim-up command subsequently received, it is possible to prevent the user from accidentally operating the trim device to trim up, which may lead to the release of the limit of the trim device and the loss of the limit protection function.

In the above embodiment, the predetermined duration may be determined based on a duration during which the trim angle of the trim device changes from the entry angle to the angle at which the trim device enters the limit protection mode (hereinafter referred to as the first duration). The predetermined duration may be positively correlated with the first duration. In some embodiments, the first duration may be directly determined as the predetermined duration. In some embodiments, the sum of the first duration and a second duration may be determined as the predetermined duration, wherein the second duration is the duration from the angle at which the trim device enters the limit protection mode to the angle at which the trim device exits the limit protection mode. In some embodiments, the predetermined duration may be determined to be a numerical value between the first duration and the second duration. During the trim process of the trim device, when the trim angle of the trim device reaches the angle at which the trim device enters the limit protection mode, when the trim device receives the trim-up command again, the trim device may directly exit the limit protection mode. Therefore, under the condition that the ΔT exceeds the predetermined duration, the trim-up command received again is shielded, and the situation that the trim device directly exits the limit protection mode under the action of the trim-up command received again after the trim device enters the limit protection mode, thus avoiding limit failure.

Furthermore, the trim-up command received again can be shielded only in the case that the ΔT exceeds the predetermined duration and is less than an effective operation time interval. Under the condition that the ΔT is greater than or equal to the effective operation time interval, the trim device is controlled to trim up according to the trim-up command received again, wherein the effective operation time interval is greater than the predetermined duration. The effective operation time interval can be set according to the user's actual needs. For example, the effective operation time can be set as 3 minutes or 5 minutes. In this embodiment, by distinguishing the two time intervals of the predetermined duration and the effective operation time interval, the trim-up command received again is shielded under the condition that the ΔT is less than the effective operation time interval, so that the trim device is prevented from directly exiting the limit protection mode, and the limit success rate is improved. In the time interval in which the ΔT is greater than or equal to the effective operation time interval, the trim-up command received again is not shielded, so that the user can still normally control the trim device to perform trimming, and the user experience is enhanced.

Referring to FIG. 3, the control method according to the embodiments of the present disclosure further includes: when the trim-up command is continuously received, the trim device is controlled to trim up based on the trim-up command (step S27). That is, different from the way in which the processor actively maintains the trimming in the foregoing embodiments, in this embodiment, maintaining the trim-up state of the trim device is passively executed by the processor under the command input by the user (referred to as the processor passively maintaining the trimming). In the above embodiments, two different ways are provided to maintain the trim-up state of the trim device, so that the control mode of the trim device is more flexible and convenient. In this way, the user does not need to determine whether to continue to send the trim-up command based on whether the trim angle of the trim device reaches the entry angle, and the trim device can be controlled to trim up until the trim angle reaches the limit angle whether the user continues to input the trim-up command or not after the trim angle of the trim device reaches the entry angle.

Figure 4:
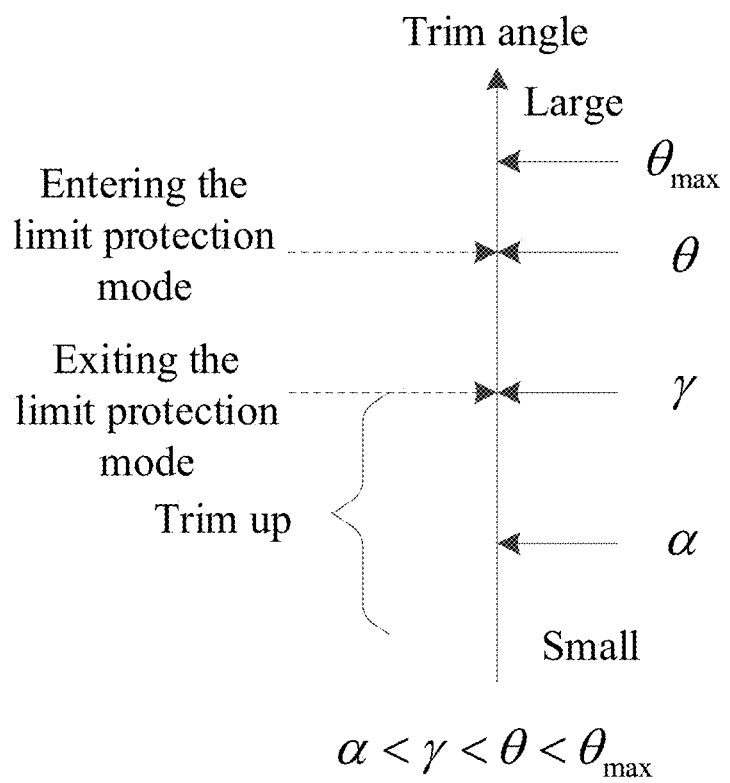

In some embodiments, referring to FIG. 4, the trim device starts to exit the limit protection mode when the trim angle reaches the exit angle θ, wherein the exit angle θ is greater than the limit angle γ. That is, after the trim device enters the limit protection mode, the trim device needs to trim up to make the trim angle reach the exit angle θ first and then start to exit the limit protection mode. In this case, the control method of the embodiments of the present disclosure further includes: obtaining the trim angle of the trim device when the trim-up command stops being received, and sending a prompt message that the trim device fails to be limited when the trim angle is between the exit angle θ and an ultimate angle θmax, wherein the ultimate angle θmax is the maximum trim-up angle of the trim device.

In practical applications, the user may continue to send the trim-up command for a period of time after the trim angle of the trim device reaches the limit angle γ, which will cause the trim device to exit the limit protection mode. By obtaining the trim angle of the trim device when the trim device stops receiving the trim-up command, it can be determined whether the trim device has started to exit the limit protection mode when the user stops sending the trim-up command. When the trim angle of the trim device is between the exit angle θ and the ultimate angle θmax when the trim-up command stops being received, it indicates that the trim device has started to exit the limit protection mode and the current limit has failed. The state of the limit failure can be notified to the user by sending the prompt message that the trim device fails to be limited, so that the user can take subsequent operations in time. For example, a trim-up command is resent. The prompt message may comprise, but is not limited to, at least one of audio prompt message, text prompt message, indicator light prompt message, etc.

In some other embodiments, the control method of the embodiments of the present disclosure further includes: when the trim-up command stops being received, and the trim angle of the trim device is between the exit angle and the ultimate angle, the trim device is controlled to execute a corresponding trim action, so that the trim device enters the limit protection mode again. In the embodiment, the processor can automatically control the trim device to enter the limit protection mode again under the condition that the trim device fails to be limited without manual control of the user, so that the operation complexity of the trim device is further reduced.

In some embodiments, the process of controlling the trim device to execute the corresponding trim action includes controlling the trim device trim down and trim up in sequence when the difference between the trim angle and the ultimate angle θmax is less than a preset difference. The difference between the trim angle and the ultimate angle θmax is less than the preset difference, which indicates that the trim device has met the trim-down condition and will not be stuck at the position of the limit mechanism. Controlling the trim device to trim down first enables the trim device to return to the state before the trim device trims up. After the trim device trims down, the trim device is controlled to trim up, so that the trim device can automatically recover to the state in the limit protection mode again after exiting the limit protection mode. In this embodiment, when the trim device is controlled to trim up, it is still possible to first detect whether the trim angle reaches the entry angle, and when so, the trim-up state of the trim device is maintained until the trim angle of the trim device reaches the limit angle. Please refer to the foregoing embodiments for the specific control mode, which will not be described here.

The process of controlling the trim device to execute the corresponding trim action also includes controlling the trim device 100 to trim up, trim down, and trim up in sequence when the difference value between the trim angle and the ultimate angle θmax is greater than the preset difference. Among the actions executed in sequence, the first trim-up action is used to ensure that the trim device meets the trim-down condition and will not be stuck at the position of the limit mechanism. After the first trim-up action is executed, when the difference between the trim angle and the ultimate angle is less than or equal to the preset difference, the trim-down action can be executed, so that the trim device can return to the state in which the trim device can enter the limit protection mode by trimming up. The second trim-up action is used to enable the trim device to automatically return to the limit protection mode after the trim device exits the limit protection mode.

Further, in the process of controlling the trim device to execute the corresponding trim action to enable the trim device to enter the limit protection mode again, prompt message such as audio prompt message, text prompt message, indicator light prompt message, and the like may also be output to prompt the user that the trim device is currently trying to perform trimming again to enter the limit protection mode.

In some embodiments, the control method of the embodiments of the present disclosure further includes blocks a first command (e.g., a trim-down command, a trim pause command, etc.) of which the priority is not higher than that of the trim-up command when receiving the trim-up command, so as to completely execute the control process of the trim device and the trim device successfully enters the limit protection mode. Further, the operation of blocks the first command may be executed when the trim angle reaches the entry angle and does not reach the limit angle. The control method of the embodiments of the present disclosure further includes controlling the trim device to stop trimming up and execute a second command (e.g., a whole-machine power-down command for the water propeller, a whole-machine emergency-stop command for the water propeller, etc.) when receiving the second command with a priority higher than that of the trim-up command during the period when the trim angle reaches the entry angle and does not reach the limit angle. Since the second command with higher priority is generally related to the safety of the operation of the water propeller and the boat, the second command is executed in priority when receiving the second command, so that the safety of the operation of the water propeller and the boat can be ensured.

Further, after the execution of the second command is completed, it may be determined whether it is necessary to continue to control the trim device to trim up according to the actual situation. For example, the user may input a trim-up command to control the trim device to continue to complete the suspended trim process. In some embodiments, a trim-down command may be input to control the trim device to trim down. For another example, after the execution of the second command is completed, the trim device may also be automatically controlled to continue to complete the suspended trim process without the user inputting the command again.

Figure 5:
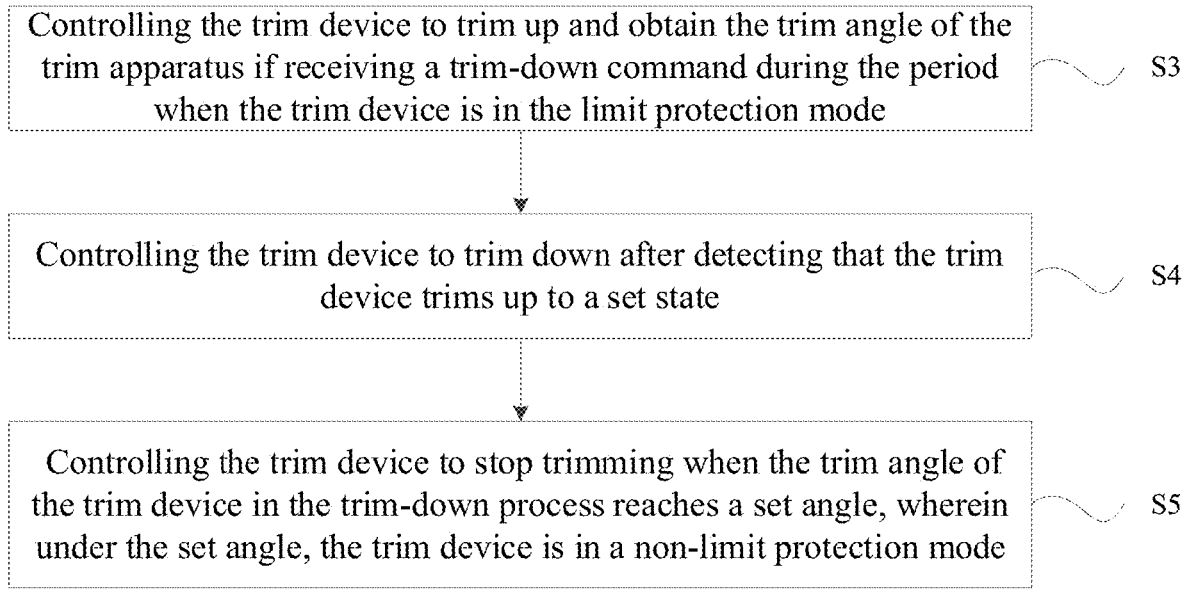
FIG. 5 is a flow chart of another embodiment of the control method of the trim device according to some embodiments of the present disclosure.

In some embodiments, the present disclosure further provides a control method for controlling the trim device when the trim device is in the limit protection mode, so that the trim device can exit the limit protection mode. The manner of entering the limit protection mode may adopt the method of the foregoing embodiments, or detect whether the trim device is in the limit protection mode based on an output signal of a travel switch. Referring to FIG. 5, the method of this embodiment includes the following steps.

Step S3, controlling the trim device to trim up and obtain the trim angle of the trim device when receiving a trim-down command during the period when the trim device is in the limit protection mode.

Step S4, controlling the trim device to trim down after detecting that the trim device trims up to a set state.

Step S5, controlling the trim device to stop trimming when the trim angle of the trim device in the trim-down process reaches a set angle, wherein under the set angle, the trim device is in a non-limit protection mode.

In step S3, the user may send the trim-down command to the trim device while the trim device is in the limit protection mode. For example, an interactive component (e.g., a button, a touch screen, or an operating handle) in communication connection with the trim device may be provided, and the user may input the trim-down command through the interactive component. After receiving the trim-down command, the trim device may first trim up. In some embodiments, the interaction component used to send the trim-up command may be a different component than the interaction component used to send the trim-down command. The trim device can also be provided with a sensor assembly for detecting and outputting the trim angle of the trim device in real-time.

In step S4, when it is detected that the trim device trims up to the set state, the trim device may be controlled to trim down. In some embodiments, detecting that the trim device trims up to the set state specifically includes detecting that the trim angle reaches the ultimate angle θmax, wherein the ultimate angle θmax is the maximum angle at which the trim device trims up. For example, the trim angle detected by the sensor assembly may be obtained, and when the trim angle reaches the ultimate angle θmax, it is determined that the trim device has reached the set state. In some other embodiments, detecting that the trim device trims up to the set state specifically includes detecting that the trim angle remains unchanged within a set time. In this embodiment, the trim device can be continuously controlled to trim up, and the variation of the trim angle detected by the sensor assembly can be obtained. When the variation fluctuates in a small range within the preset period, or the difference between any two of the multiple trim angles obtained within the preset period is less than a preset value (also referred to as a stalled rotation), it is determined that the trim device reaches the set state. By detecting the set state, it can be ensured that the trim device trims up to a sufficient height and successfully releases the limit. The problem that the trim device is stuck at the position of the limit mechanism due to insufficient trim height is reduced.

In step S5, the set angle may be determined based on the angle at which the trim device enters the limit protection mode and a set angle margin, and the set angle is smaller than the angle at which the trim device enters the limit protection mode. In a non-limiting embodiment, the difference between the angle at which the trim device enters the limit protection mode and the set angle margin may be determined as the set angle. In some embodiments, the set angle may be the same as the entry angle in the foregoing embodiments, but the present disclosure is not limited thereto. By setting the set angle margin, the situation that the trim device is misjudged to be in the state capable of entering the limit protection mode through direct trim up when the trim device is not in the state capable of entering the limit protection mode through directly trimming up because the angle fed back by the sensor assemble is not accurate enough can be reduced, and the control accuracy of the trim device is improved.

In the embodiments of the present disclosure, when the trim device is in the limit protection mode, when a trim-down command is received, the trim device can be automatically controlled to trim up to the set state by detecting the trim angle, and then the trim device is controlled to be trim down until the trim angle reaches the set angle, so that the trim device exits the limit protection mode. The process reduces the user's operation and reduces the operation complexity of the control manner. In addition, compared with a manner of manually controlling the trim device to exit from the limit protection mode, the manner in this embodiment reduces the situation in which the user incorrectly determines the trim device has exited the limit protection mode and directly controls the trim device to perform normal trimming process, and the situation in which the user control the trim device to trim down when the trim device is in the limit protection mode. The risk of causing physical damage to the limit mechanism is reduced, and the safety of the trim device is improved.

In some embodiments, the step when the trim device is in the limit protection mode, when a trim-down command is received, the trim device is controlled to trim up, and the trim angle of the trim device is obtained includes the following steps: controlling the trim device to trim up and obtain the trim angle when receiving the trim-down command and the duration of the trim-down command exceeds a first set duration during the period when the trim device is in the limit protection mode. The first set duration may be determined according to actual needs. For example, the first set duration may be 2 seconds or 3 seconds. By setting the first set duration, the misoperation of the user can be reduced.

In some embodiments, the control method of the embodiments of the present disclosure further includes blocks a first command whose priority is not higher than that of the trim-down command during the period when the trim device trims based on the trim-down command, so as to completely execute the control process of the trim device and the trim device can successfully exit the limit protection mode. The control method of the embodiments of the present disclosure further includes: controlling the trim device to stop trimming and execute a second command when receiving a second command whose priority is higher than that of the trim-down command during the period when the trim device trims based on the trim-down command. Since the second command with higher priority is generally related to the safety of the operation of the water propeller and the boat, the second command is executed in priority when receiving the second command, so that the safety of the operation of the water propeller and the boat can be ensured.

The first command and the second command in this embodiment may be the same as or different from the first command and the second command in the case of receiving the trim-up command in the foregoing embodiments. In some embodiments, the same priority may be set for the trim-up command and the trim-down command. In this way, the first command whose priority is not higher than that of the trim-up command and the first command whose priority is not higher than that of the trim-down command can be the same first command. Similarly, the second command whose priority is higher than that of the trim-up command and the second command whose priority is higher than that of the trim-down command can also be the same second command. Of course, in other embodiments, different priorities can also be set for the trim-up command and the trim-down command, respectively.

It is easy to understand that the solutions introduced in the above embodiments can be freely combined to obtain new solutions in the absence of conflict, and in view of space reasons, they are not repeated here.

Figure 6:
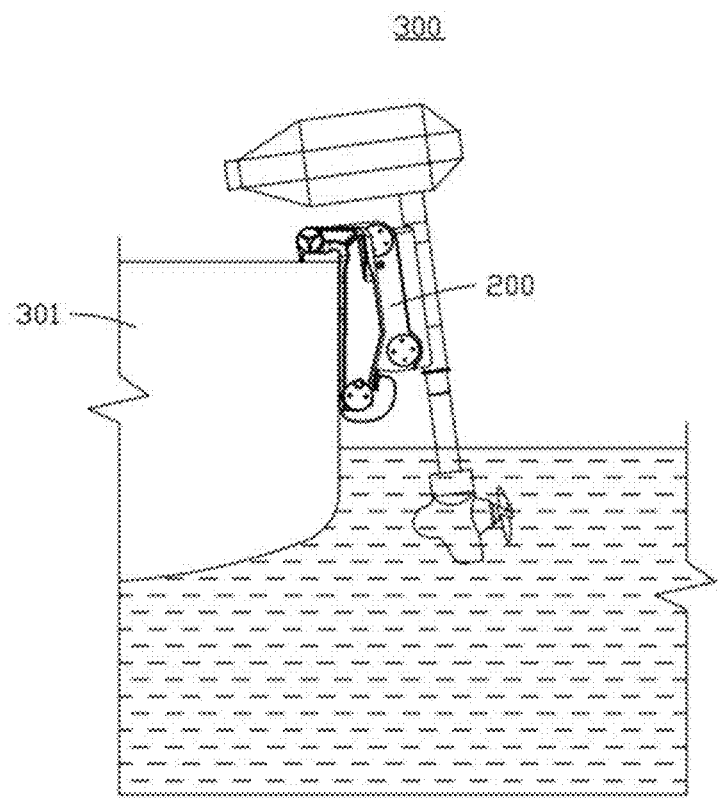
FIG. 6 is a schematic structural diagram of a water-mobile device of some embodiments of the present disclosure.

As shown in FIG. 6, the embodiments of the present disclosure further provide a water-mobile device 300. The water-mobile device 300 includes a movable body 301 and a water propeller 200, and the water propeller 200 is movably connected to the movable body 301. The water propeller 200 is used as a force supply device for the water-mobile device 300, and the posture of the water propeller 200 can be changed relative to the movable body 301, so that the water propeller 200 can be placed under the water surface when the water propeller 200 needs to be used, thereby providing a driving force for the movement of the movable body 301. When it is not necessary to use the water propeller 200, the water propeller 200 is placed above the water surface to reduce the resistance of the water current to the movement of the movable body 301.

The water-mobile device 300 of the present embodiment may be various water vehicles such as commercial boats, passenger boats, yachts, fishing boats, sailboats, and civilian boats, and may also be a device that can move in water areas such as water patrol inspection devices, water governance devices, and water environment monitoring devices, which is not limited in the present disclosure. The water propeller 200 of the present embodiment may be a device capable of providing force, such as an outboard engine, a pod propeller, or the like. The water propeller 200 may be mounted on the bow, the stern, or the side of the movable body 301, and can be used as a side propeller to assist the steering of the water-mobile device 300 when mounted on the side of the movable body 301.

Figure 7:
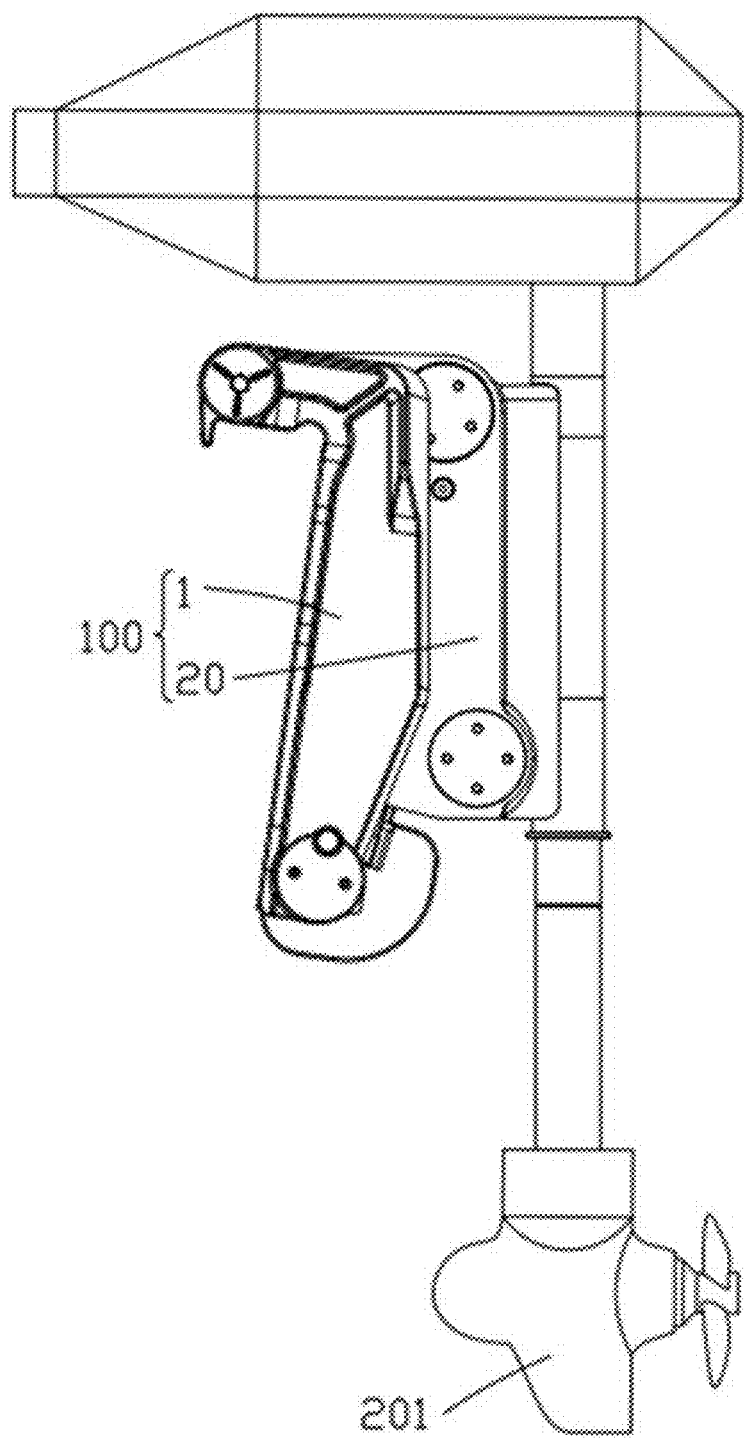
FIG. 7 is a structural diagram of the water propeller according to some embodiments of the present disclosure.

As shown in FIG. 7, the embodiments of the present disclosure further provide a water propeller 200. The water propeller 200 includes a main unit 201 and a trim device 100, and the trim device 100 is connected to the main unit 201. In some embodiments, the main unit 201 at least includes a propeller and a motor, and the propeller is connected to a driving shaft of the motor to rotate under the driving of the motor.

Figure 21:
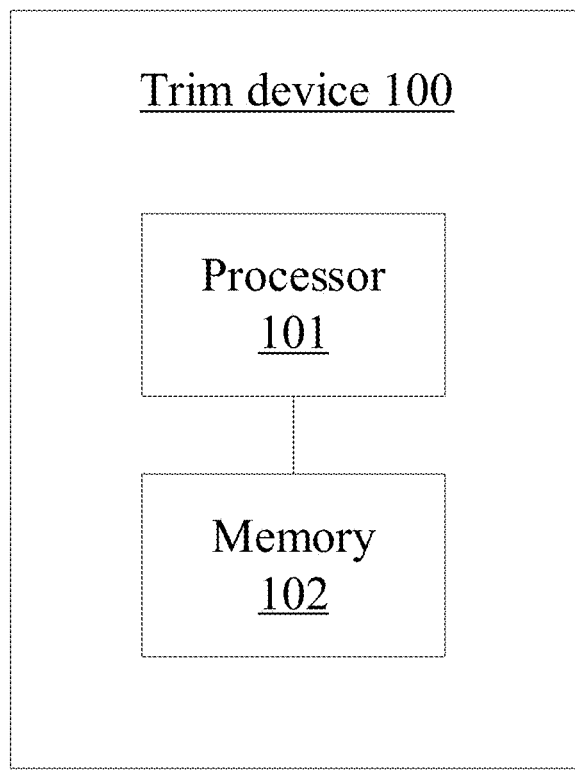
FIG. 21 is a block diagram of a trim device of the present disclosure.

Referring to FIG. 21, the embodiments of the present disclosure further provide a trim device 100, the trim device 100 includes a processor 101 and a memory 102, and the memory 102 stores a program. When the program is executed by the processor 101, the program executes the control method of the trim device 100 described in any of the above embodiments. The above-described trim device 100 may be used in the water-mobile device 300 shown in FIG. 6 or the water propeller 200 shown in FIG. 7.

In some embodiments, referring to FIG. 7, the trim device 100 further includes a clamp bracket 1 and a trim bracket 20. The main unit 201 is connected to the trim bracket 20. The clamp bracket 1 is fixed to the movable body 301, and the trim bracket 20 is connected to the clamp bracket 1 and can trim relative to the clamp bracket 1, so that the main unit 201 connected to the trim bracket 20 can trim relative to the movable body 301. In this way, when the water propeller 200 is not required to be used, the main unit 201 is lifted above the water surface after the trim bracket 20 trims, and when the water propeller 200 is required to be used, the main unit 201 falls below the water surface after the trim bracket 20 is unlocked and released.

Figure 8:
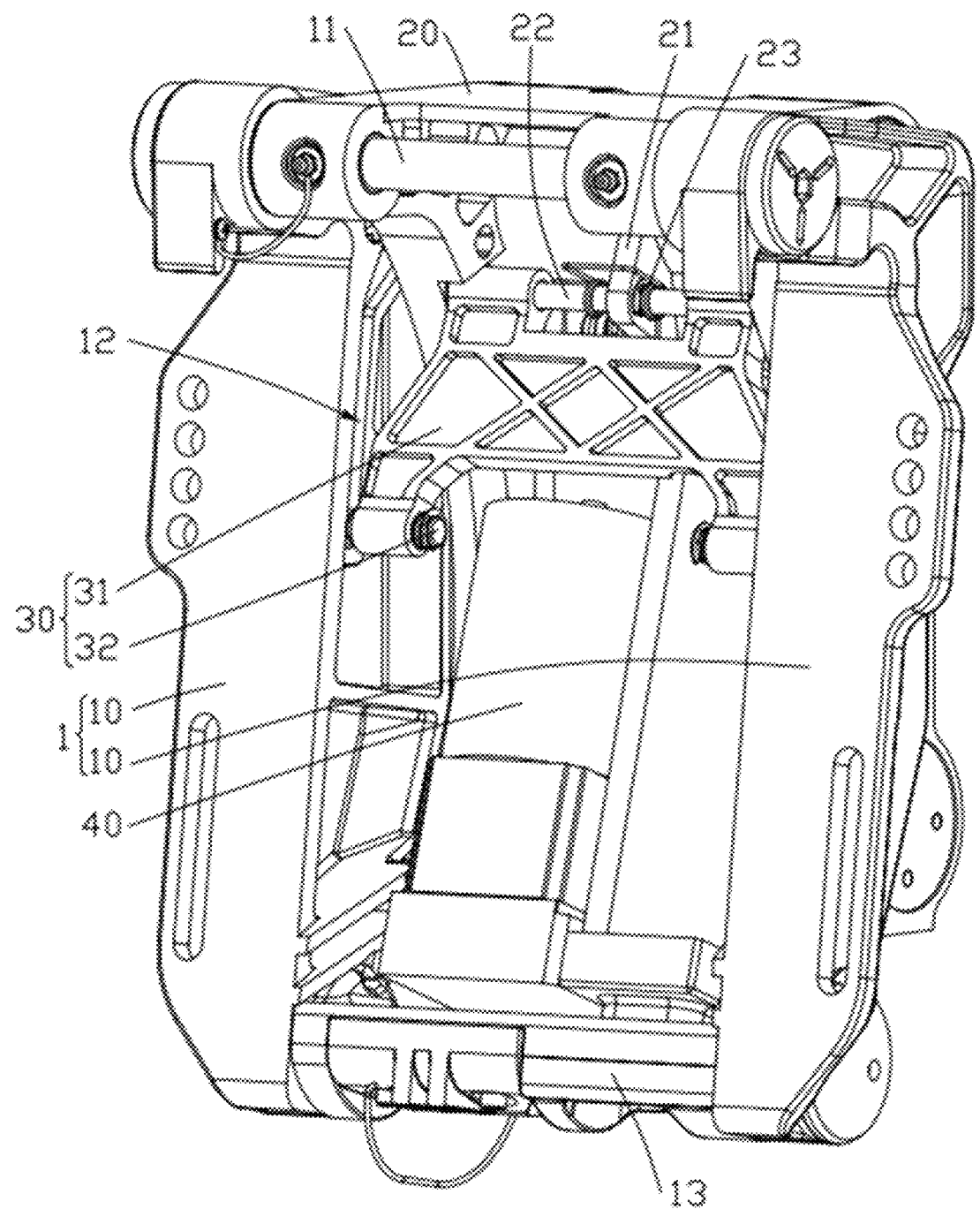
FIG. 8 is a three-dimensional schematic diagram of the trim device according to some embodiments of the present disclosure.
Figure 9:
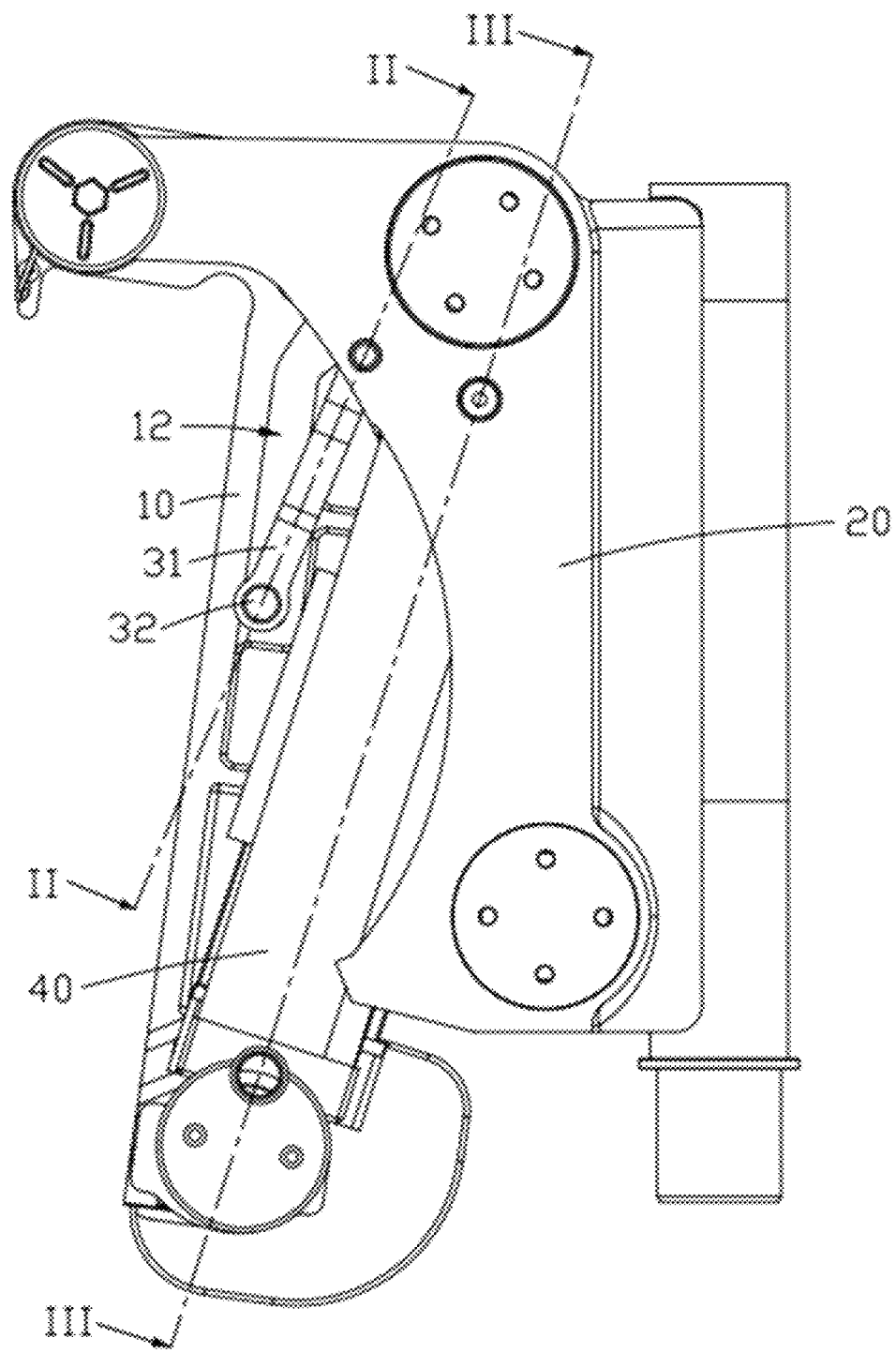
FIG. 9 is a schematic plan view of the trim device according to some embodiments of the present disclosure.
Figure 10:
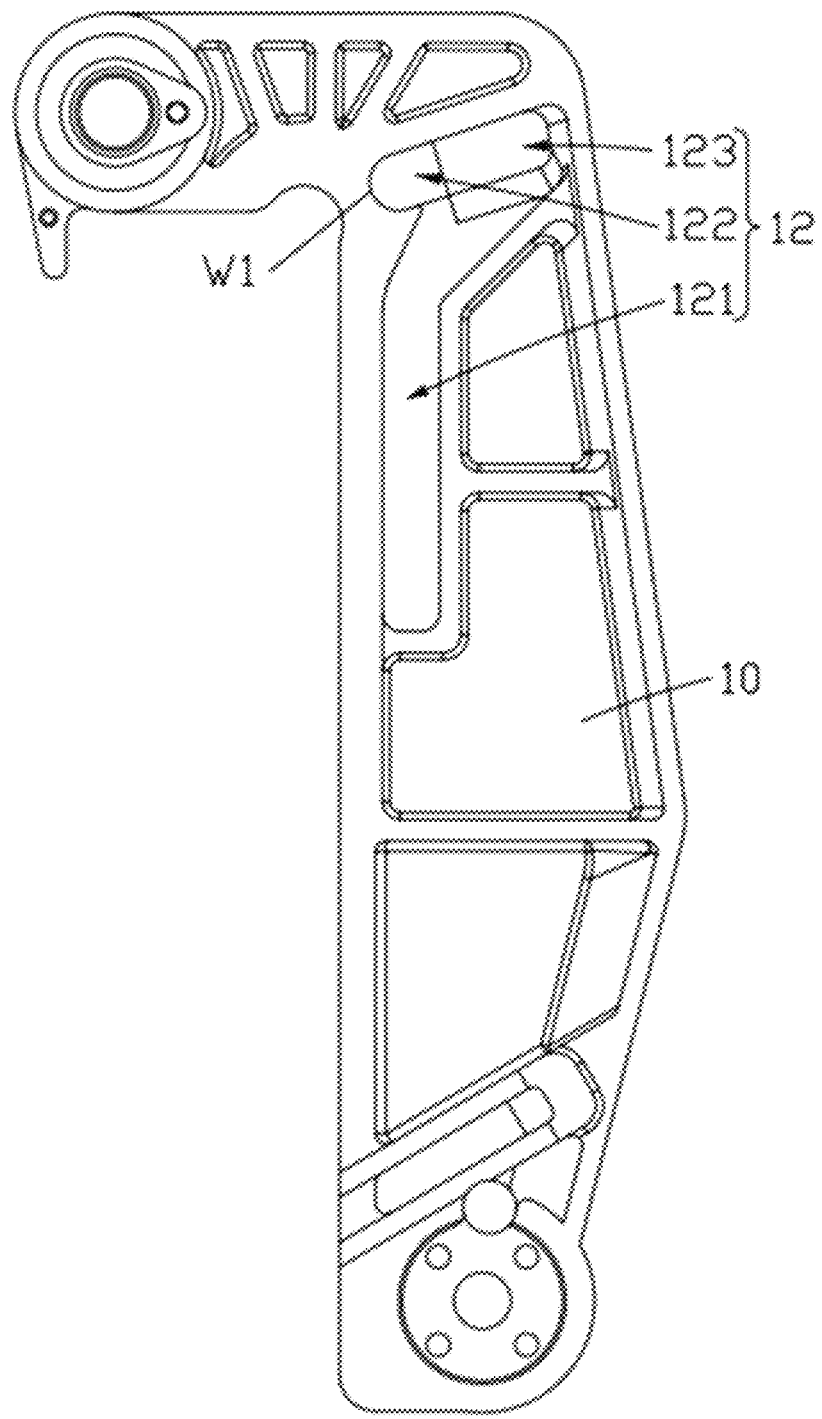
FIG. 10 is a schematic plan view of a clamp bracket of the trim device according to some embodiments of the present disclosure.
Figure 11:
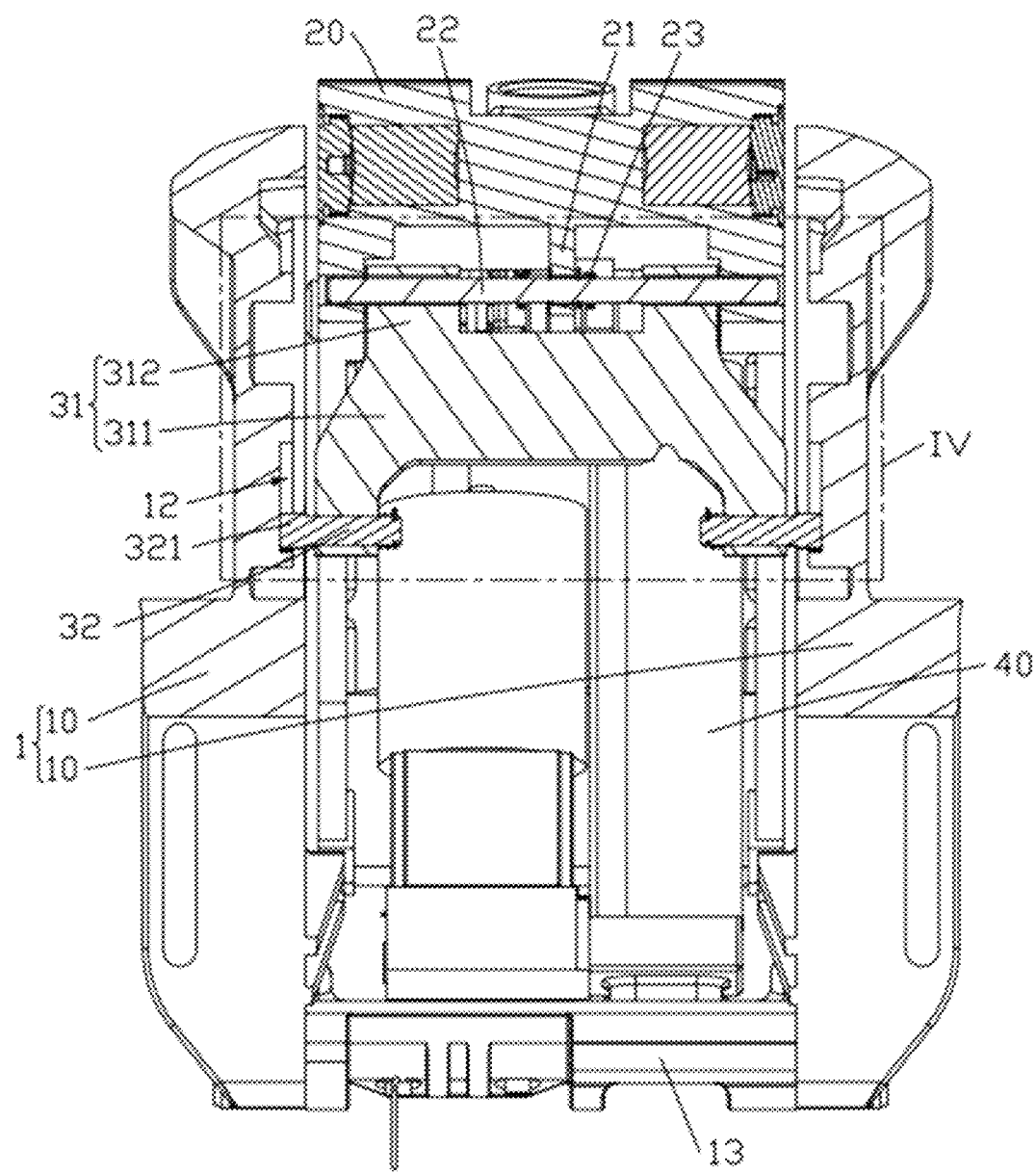
FIG. 11 is a sectional view of the trim device of FIG. 9 taken along plane II-II.

FIG. 8 to FIG. 10 further show the structure of the trim device 100 according to the embodiments of the present disclosure. The trim device 100 includes a clamp bracket 1, a trim bracket 20, and a limiting bracket 30. The clamp bracket 1 is provided with a trim shaft 11 and a sliding groove 12. The sliding groove 12 includes a sliding section 121, a limiting section 122 and an unlocking section 123. The groove depth of the sliding section 121 is smaller than that of the limiting section 122, and the groove depth of the limiting section 122 is smaller than that of the unlocking section 123. The trim bracket 20 is connected to the trim shaft 11 and configured to trim relative to the clamp bracket 1, and the trim bracket 20 is connected to the main unit 201. The limiting bracket 30 includes a bracket body 31 and a limiting shaft 32. One end of the bracket body 31 is rotatably connected to the trim bracket 20, and the other end of the bracket body 31 is connected to the limiting shaft 32. The limiting shaft 32 is configured to slide relative to the bracket body 31 in a direction parallel to the trim shaft 11, and the end portion of the limiting shaft 32 is further slidably fitted to the sliding groove 12. One end of the limiting section 122 is set as a latching position W1, and the other end of the limiting section 122 is connected to the unlocking section 123, so that the limiting shaft 32 enters the unlocking section 123 after being separated from the latching position W1 under a driving force.

In some embodiments, the trim device 100 is in the limit protection mode when the end portion of the limiting shaft 32 abuts against the limit section 122. In other embodiments, when the trim angle reaches the set angle, the end portion of the limiting shaft 32 abuts against the sliding section 121. In some embodiments, when the trim angle reaches the entry angle, the end portion of the limiting shaft 32 abuts against the sliding section 121. The set angle and the entry angle may be the same or different. In other embodiments, when the trim angle reaches the limit angle, the end portion of the limiting shaft 32 abuts against the limiting section 122. When the trim angle reaches the exit angle or the ultimate angle, the end portion of the limiting shaft 32 abuts against the unlocking section 123. Furthermore, when the trim angle is between the exit angle and the ultimate angle, the end portion of the limiting shaft 32 also abuts against the unlocking section 123.

As shown in FIG. 6, FIG. 7, FIG. 11, and FIG. 12, in some embodiments, the clamp bracket 1 includes two clamping lugs 10, and the two clamping lugs 10 are arranged oppositely at intervals. Correspondingly, two sliding grooves 12 are provided, and the two sliding grooves 12 are respectively provided on the opposite sides of the two clamping lugs 10. The trim bracket 20 is at least partially mounted between the two clamping lugs 10, and both ends of the trim shaft 11 penetrate through the trim bracket 20, so that the trim bracket 20 is rotatably mounted on the two clamping lugs 10. The trim bracket 20 rotates around the axis of the trim shaft 11 under the action of a driving force, so that the trim bracket 20 trims after rotating relative to the two clamping lugs 10. Meanwhile, the trim bracket 20 is also connected to the main unit 201, and the main unit 201 is driven to move when the trim bracket 20 trims, so that the main unit 201 presents different postures relative to the movable body 301.

The bracket body 31 is disposed between the two clamping lugs 10, and the bracket body 31 includes a first end 311 and a second end 312. Both sides of the first end 311 of the bracket body 31 close to the two clamping lugs 10 are respectively provided with a limiting shaft 32. The limiting shaft 32 is arranged parallel to the axis of the trim shaft 11, and one end of the limiting shaft 32 close to the sliding groove 12 is in sliding fit with the sliding groove 12, so that the two clamping lugs 10 not only support the bracket body 31 from both sides thereof, but also the first end 311 of the bracket body 31 can move relative to the sliding groove 12 through the limiting shaft 32. In particular, a bushing 321 is provided at an end portion of the limiting shaft 32 close to the sliding groove 12, the outer diameter of the bushing 321 is greater than the outer diameter of the limiting shaft 32, and the outer diameter of the bushing 321 is smaller than the minimum groove width of the sliding groove 12. The bushing 321 is made of a flexible material and abuts against the wall surface of the sliding groove 12, so that the bushing 321 has a damping and buffering effect on the movement of the limiting shaft 32 in the sliding groove 12.

The second end 312 of the bracket body 31 is rotatably connected to the trim bracket 20 through a rotating shaft 22. The rotating shaft 22 is parallel to the axis of the trim shaft 11, and two ends of the rotating shaft 22 are respectively fixed on two opposite sides of the trim bracket 20, so that the rotating shaft 22 is fixed relative to the trim bracket 20. The second end 312 of the bracket body 31 defines a perforation 3120 for the rotating shaft 22 to pass through, so that the second end 312 of the bracket body 31 can be rotatably mounted on the rotating shaft 22, and the second end 312 of the bracket body 31 can rotate around the axis of the rotating shaft 22.

In particular, the trim bracket 20 is provided with a lug plate 21, and the lug plate 21 is provided with a through hole 210 for the rotating shaft 22 to pass through. The lug plate 21 is substantially located at a middle position of the rotating shaft 22, and a torsion spring 23 is sleeved at the middle position of the rotating shaft 22.

The torsion spring 23 provides a force for the bracket body 31 to open relative to the trim bracket 20, so that the bracket body 31 opens relative to the trim bracket 20 under the tension of the torsion spring 23. That is, the opening direction of the bracket body 31 relative to the rotating shaft 22 is opposite to the rotating direction of the trim bracket 20 relative to the rotating shaft 22, forcing the limiting shaft 32 to open relative to the trim bracket 20 with the opening of the bracket body 31, so that the limiting shaft 32 always has a tendency to abut outward when the trim bracket 20 trims or is released, the outer peripheral surface of the limiting shaft 32 is made to slide against the inner side wall of the sliding groove 12, and the inner side wall of the sliding groove 12 plays a role in guiding the sliding of the limiting shaft 32.

In this way, when the trim bracket 20 trims under the action of a driving force, the driving force can be provided by a power device or manpower and applied to the trim bracket 20, so that the trim bracket 20 can trim relative to the movable body 301. The driving force appearing in the following description is the same as the current driving force. The trim bracket 20 drives the bracket body 31 to move with the trim bracket 20 through the rotating shaft 22 fixedly connected to the trim bracket 20. At this time, the limiting shaft 32 disposed on the first end 311 of the bracket body 31 moves substantially along a fixed track due to the limiting effect of the sliding groove 12, so that the second end 312 of the bracket body 31 rotates around the axis of the rotating shaft 22, thereby changing the posture of the bracket body 31 relative to the trim bracket 20. During the posture change of the bracket body 31 relative to the trim bracket 20, the bracket body 31 can limit the trim angle of the trim bracket 20, so that the trim process of the trim bracket 20 is smoother. The trim angle of the trim bracket 20 is the angle at which the free end of the trim bracket 20 rotates around the rotation shaft 22 from the position where the trim bracket 20 abuts against the clamp bracket 1 to the position where the trim bracket 20 is separated from the clamp bracket 1. At the same time, when the trim bracket 20 trims under the action of a driving force, the trim bracket 20 drives the bracket body 31 to move with the trim bracket 20 through the rotating shaft 22 fixedly connected with the trim bracket 20, so that the limiting shaft 32 moves toward the trim direction of the trim bracket 20 in the sliding groove 12 to the state of abutting against the inner side wall of the sliding groove 12, and when the trim bracket 20 continues to trim, the limiting shaft 32 slides upward against the inner side wall of the sliding groove 12. The inner side wall of the sliding groove 12 directly guides the sliding of the limiting shaft 32.

When the trim bracket 20 falls back under the action of its gravity after being released, the bracket body 31 also falls back under the action of its own gravity, so that the limiting shaft 32 moves toward the falling direction of the trim bracket 20 in the sliding groove 12 to the state of abutting against the inner side wall of the sliding groove 12. When the bracket body 31 continues to fall back, the limiting shaft 32 always slides downward against the inner side wall of the sliding groove 12. The inner side wall of the sliding groove 12 directly guides the sliding of the limiting shaft 32.

Figure 13:
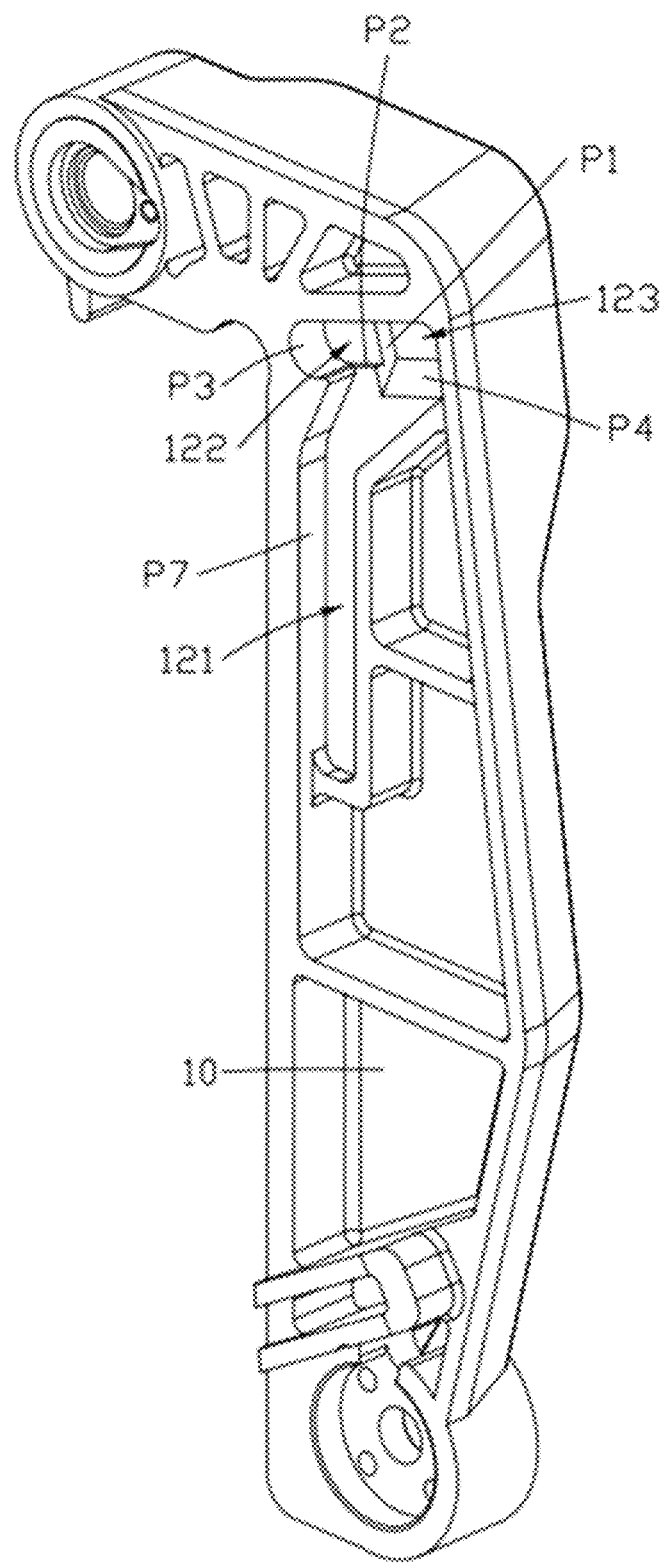
FIG. 13 is a structural schematic diagram of a clamp bracket in some embodiments of the tilting device of the present disclosure.
Figure 14:
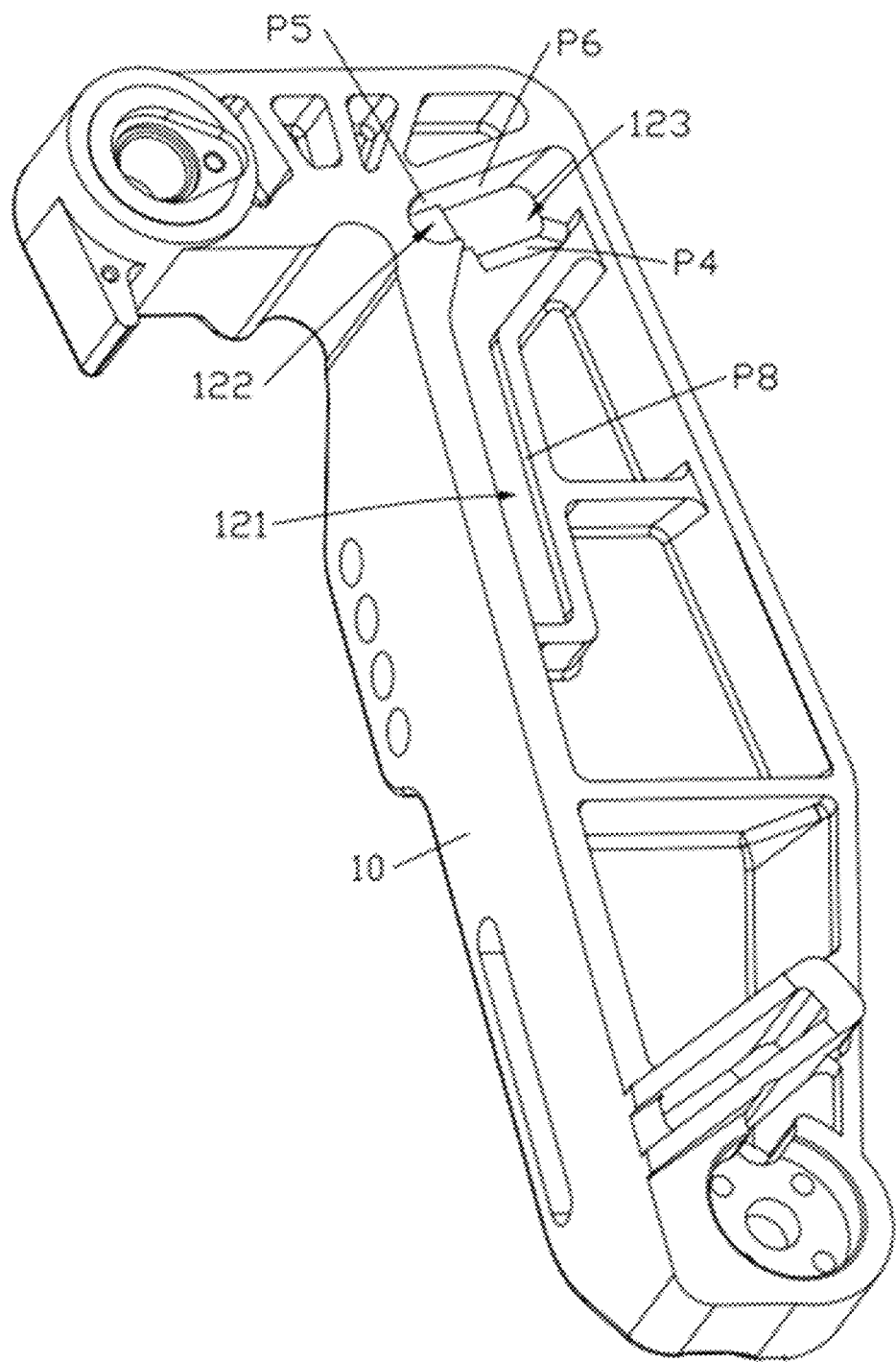
FIG. 14 is a schematic structural diagram of a clamp bracket in some embodiments of the trim device according to the present disclosure from another perspective.

As shown in FIG. 10 and FIGS. 13-14, in some embodiments, the limiting section 122 is arranged obliquely, one end of the limiting section 122 is connected to the sliding section 121, the other end of the limiting section 122 is arranged as the latching position W1, and the latching position W1 is a concave slot away from the sliding section 121. When the trim device 100 trims under the action of a driving force, the trim device 100 makes the limiting shaft 32 enter the limiting section 122 from the sliding section 121, so that the trim device 100 enters the limit protection mode. In addition, since the groove depth of the sliding section 121 is less than that of the limiting section 122, the end portion of the limiting shaft 32 moves toward the bottom of the sliding groove 12 along the axial direction thereof, and the end portion of the limiting shaft 32 always abuts against the bottom of the sliding groove 12, so that the limiting shaft 32 cannot move from the limiting section 122 to the sliding section 121. In this way, after the driving force is removed, the trim device 100 makes the limiting shaft 32 move to the latching position W1 along the limiting section 122 under the action of its gravity and then the limiting shaft 32 is latched, so that the trim device 100 can still maintain the trimming state after the driving force is removed.

It should be noted that both the sliding section 121 and the limiting section 122 are partial sections of the sliding groove 12. The sliding groove 12 is a groove formed by inwardly slotting from the side face of the clamping lug 10 facing the limiting shaft 32, and the groove depth of the sliding groove 12 refers to the vertical distance from the side face of the clamping lug 10 facing the limiting shaft 32 to the bottom of the sliding groove 12. Correspondingly, the groove depth of the sliding section 121 is the vertical distance from the side face of the clamping lug 10 facing the limiting shaft 32 to the bottom of the sliding groove 12 corresponding to the sliding section 121, and the groove depth of the limiting section 122 is the vertical distance from the side face of the clamping lug 10 facing the limiting shaft 32 to the bottom of the sliding groove 12 corresponding to the limiting section 122.

Meanwhile, the unlocking section 123 is connected to a higher end of the limiting section 122. When the trim device 100 needs to be unlocked, the trim device 100 continues to trim under the action of a driving force, so that the limiting shaft 32 is separated from the latching position W1 and transports to the unlocking section 123, and then the trim device 100 starts to exit the limit protection mode. Since the groove depth of the limiting section 122 is less than the groove depth of the unlocking section 123, the end portion of the limiting shaft 32 axially moves toward the bottom of the sliding groove 12, and the end portion of the limiting shaft 32 always abuts against the bottom of the sliding groove 12, so that the limiting shaft 32 cannot move from the unlocking section 123 to the limiting section 122, and the limiting shaft 32 strike the groove bottom of the unlocking section 123 which makes a striking sound, thereby reminding the outside that the unlocking action has been completed. In this way, after the unlocking action is completed, the driving force is removed, and the trim device 100 makes the limiting shaft 32 move from the unlocking section 123 to the sliding section 121 under the action of its gravity, and continues to slide down along the sliding section 121 to complete the releasing action.

It should be noted that the unlocking section 123 is a partial section of the sliding groove 12. As described above, the groove depth of the unlocking section 123 is the vertical distance from the side face of the clamping lug 10 facing the limiting shaft 32 to the bottom of the sliding groove 12 corresponding to the unlocking section 123.

To sum up, in the trim device 100 of the present disclosure, the clamping lug 10 is provided with the sliding groove 12, so that the limiting shaft 32 is slidably fitted in the sliding groove 12, and the end portion of the limiting shaft 32 can slide relative to the sliding groove 12 along the axial direction thereof. Meanwhile, the groove depth of the sliding section 121 is smaller than the groove depth of the limiting section 122. After the limiting shaft 32 enters the limiting section 122 from the sliding section 121, the end portion of the limiting shaft 32 moves axially to a position where it abuts the bottom of the limiting section 122, so that the trim device 100 is limited. The groove depth of the limiting section 122 is smaller than the groove depth of the unlocking section 123. After the limiting shaft 32 enters the unlocking section 123 from the limiting section 122 under the action of a driving force, the end portion of the limiting shaft 32 moves axially to a position where it abuts the bottom of the unlocking section 123, enabling the trim device 100 to be quickly unlocked. The trim device 100 can be unlocked merely by slightly lifting it, without the need to set an additional unlocking switch to release the trim device 100. Thus, while ensuring the quick limiting of the trim device 100 after the trimming is completed and the quick unlocking of the trim device 100, the structure of the entire trim device 100 is simplified.

Figure 12:
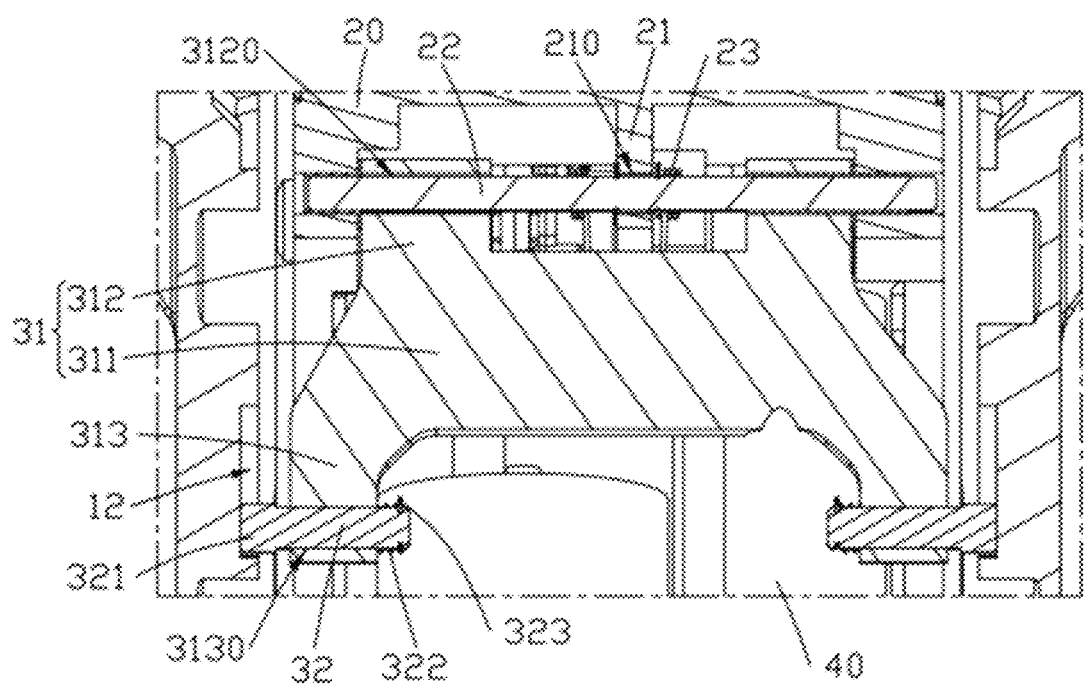
FIG. 12 is a partially enlarged schematic view of the region IV corresponding to the trim device in FIG. 11.
Figure 17:
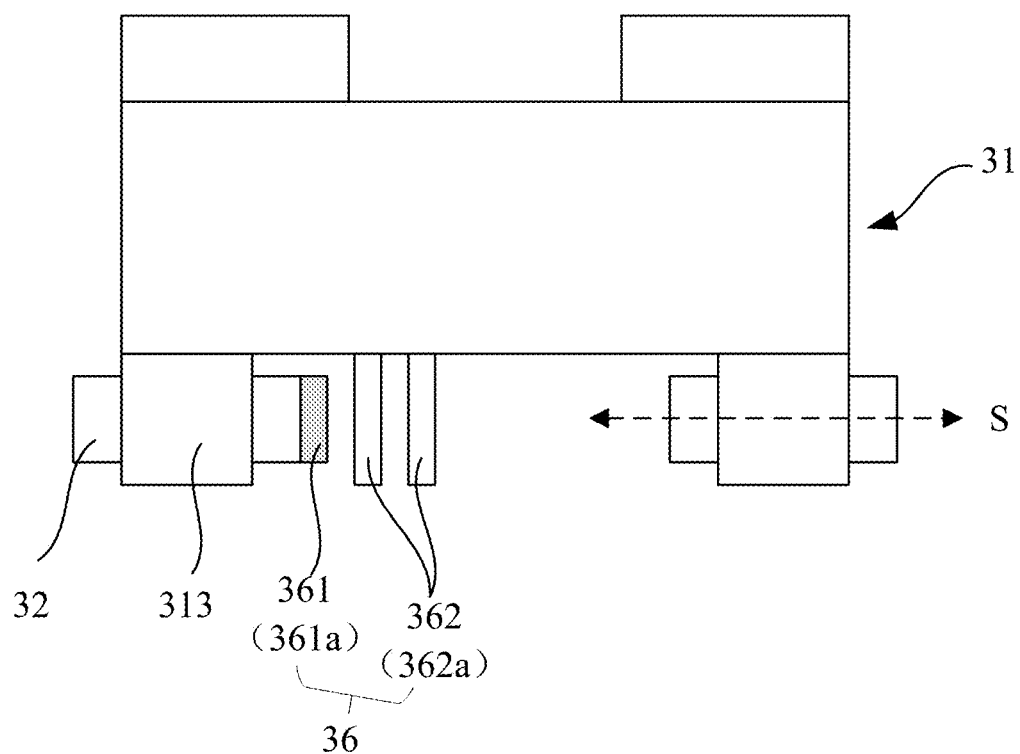
FIG. 17 is a schematic diagram of a travel switch of the present disclosure.

Referring to FIG. 12 and FIG. 17, the limiting bracket 30 further includes an elastic member 322 elastically connected between the limiting shaft 32 and the bracket body 31 for driving an end surface of the limiting shaft 32 to abut against the bottom wall of the sliding groove 12. In one embodiment, two sides of the first end 311 of the bracket body 31 are respectively provided with an extending protrusion 313, and the extending protrusion 313 extends from the first end 311 of the bracket body 31 in a direction away from the second end 312 of the bracket body 31. The extending protrusion 313 defines a mounting hole 3130, and the limiting shaft 32 is partially received in the mounting hole 3130. The limiting shaft 32 can move along the axial direction S of the corresponding mounting hole 3130. A support plate 323 and the elastic member 322 are disposed at one end of the limiting shaft 32 away from the sliding groove 12. The support plate 323 is fixed at one end of the limiting shaft 32 away from the sliding groove 12. The elastic member 322 is sleeved on the outer periphery of the limiting shaft 32, and one end of the elastic member 322 is connected to the bracket body 31, and the other end of the elastic member 322 elastically abuts against and is connected to the support plate 323. The elastic member 322 is used to apply an elastic force to the limiting shaft 32 along the axial direction thereof, so that the limiting shaft 32 is elastically reset toward the bottom of the sliding groove 12 along the axial direction thereof. It should be noted that the elastic member 322 may be a rectangular spring or the like.

Referring to FIG. 12, FIG. 13, and FIG. 14, the limiting section 122 is connected to the unlocking section 123, and a first supporting surface P1 is disposed between the limiting section 122 and the unlocking section 123. The first supporting surface P1 is used to prevent the limiting shaft 32 from entering the limiting section 122 from the unlocking section 123, thus enabling the trim device 100 to start to exit the limit protection mode. In an embodiment, since the groove depth of the limiting section 122 is smaller than the groove depth of the unlocking section 123, a step surface is formed at the connection between the limiting section 122 and the unlocking section 123, and the step surface is the first supporting surface P1. The first supporting surface P1 is substantially perpendicular to the bottom wall of the unlocking section 123, that is, the first supporting surface P1 is substantially parallel to the axial direction of the limiting shaft 32. The limiting shaft 32 slides from the limiting section 122 to pass through the first supporting surface P1 under the action of a driving force. Then, the limiting shaft 32 slides axially toward the bottom wall of the unlocking section 123 under the action of the elastic force provided by the elastic member 322. As a result, the limiting shaft 32 is abutted by the first supporting surface P1 and cannot fall back to the limiting section 122 after the driving force is removed.

Referring to FIG. 12, FIG. 13, and FIG. 14 again, the unlocking section 123 includes a guiding ramp P4, the unlocking section 123 connects to the sliding section 121 through the guiding ramp P4, and the guiding ramp P4 is used for guiding the limiting shaft 32 to enter the sliding section 121 from the unlocking section 123. In an embodiment, the guiding ramp P4 extends obliquely outward from the unlocking section 123 to the sliding section 121, and the guiding ramp P4 is configured to be a plane or a curved surface, so that when the limiting shaft 32 moving to the unlocking section 123 slides down under the action of the gravity of the trim device 100, the guiding ramp P4 guides the limiting shaft 32 to move from the unlocking section 123 to the sliding section 121 quickly, achieving the rapid release of the trim device 100 and its fallback (i.e., trim down) after the rapid release.

The guiding ramp P4 intersects with the first supporting surface P1 to ensure that after the limiting shaft 32 moves to pass through the first supporting surface P1, the limiting shaft 32 directly moves to a position abutting against the guiding ramp P4, and the guiding ramp P4 rapidly guides the limiting shaft 32 to slide down.

Referring to FIG. 12, FIG. 13, and FIG. 14 again, the sliding section 121 is connected to the limiting section 122, and a second supporting surface P2 is disposed between the sliding section 121 and the limiting section 122. The second supporting surface P2 is used to prevent the limiting shaft 32 from entering the sliding section 121 from the limiting section 122. In one embodiment, since the groove depth of the limiting section 122 is greater than the groove depth of the sliding section 121, a step surface is formed at the connection between the limiting section 122 and the sliding section 121, and the step surface is the second supporting surface P2. The second supporting surface P2 is substantially perpendicular to the bottom wall of the limiting section 122. After the limiting shaft 32 slides from the sliding section 121 to pass through the second supporting surface P2 under the action of a driving force, the limiting shaft 32 slides axially toward the bottom wall of the limiting section 122 under the action of the elastic force provided by the elastic element 322. As a result, the limiting shaft 32 is abutted by the second supporting surface P2 and cannot fall back to the sliding section 121 after the driving force is removed, and the trim device 100 is in the limit protection mode.

Referring to FIG. 12, FIG. 13, and FIG. 14 again, one end of the limiting section 122 away from the unlocking section 123 is provided with a third supporting surface P3. When the limiting shaft 32 is latched in the limiting section 122, the third supporting surface P3 abuts against the outer circumferential surface of the limiting shaft 32. In one embodiment, the third supporting surface P3 is located at the latching position W1 (shown in FIG. 10). The third support surface P3 is arranged in an arc-shaped structure and is matched with the shape of the bushing 321 of the limiting shaft 32, so that when the limiting shaft 32 moves to a position where the outer circumferential surface of the bushing 321 abuts against the third support surface P3, the limiting shaft 32 can be latched at the locking position W1 to prevent the limiting shaft 32 from being separated from the latching position W1 or shaking in the latching position W1 under the action of an external force.

Further, the third supporting surface P3 intersects with the second supporting surface P2, and the third supporting surface P3 is smoothly connected with the second supporting surface P2, so that the limiting shaft 32 can slide along the second supporting surface P2 to a position abutting against the third supporting surface P3 after the driving force is removed, and is latching at the latching position W1.

In particular, the third support surface P3 is substantially perpendicular to the bottom wall of the limiting section 122, so that the extension direction of the third support surface P3 is the same as the axial direction of the limiting shaft 32, the contact area between the third support surface P3 and the limiting shaft 32 is increased, and the stability of the limiting shaft 32 at the latching position W1 is improved.

Referring to FIG. 12, FIG. 13, and FIG. 14, a first transition wall P5 is disposed on a side of the limiting section 122 away from the sliding section 121, a second transition wall P6 is disposed on a side of the unlocking section 123 away from the sliding section 121, and the first transition wall P5 is connected to the second transition wall P6 to guide the limiting shaft 32 to move from the limiting section 122 to the unlocking section 123. In one embodiment, the first transition wall P5 is disposed opposite to the second supporting surface P2, and one end of the first transition wall P5 is smoothly connected with the third supporting surface P3. The second transition wall P6 is arranged opposite to the guiding ramp P4, and the second transition wall P6 is smoothly connected with one end of the first transition wall P5 away from the third supporting surface P3, so that the third supporting surface P3, the first transition wall P5 and the second transition wall P6 are sequentially connected end to end, thereby guiding the limiting shaft 32 to move along a preset path when the trim device 100 is unlocked, and realizing the unlocking of the trim device 100.

In particular, the first transition wall P5 and the second transition wall P6 are arranged coplanarly, so that the limiting shaft 32 can smoothly move from the first transition wall P5 to the second transition wall P6, which can improve the stability of the limiting shaft 32 when the limiting shaft 32 enters the unlocking section 123 from the limiting section 122.

In this way, when the trim device 100 is unlocked, the limiting shaft 32 is separated from the third supporting surface P3 under the action of a driving force, and slides toward the unlocking section 123 in close contact with the first transition wall P5. Since the first transition wall P5 and the second transition wall P6 are smoothly connected, the limiting shaft 32 can be guided to move closely along the first transition wall P5 and the second transition wall P6 to the unlocking section 123, thus realizing the unlocking of the trim device 100.

Referring to FIG. 12, FIG. 13, and FIG. 14, the sliding section 121 includes a first side wall P7. When the limiting shaft 32 moves toward the limiting section 122 in the sliding section 121, the first side wall P7 abuts against an outer circumferential surface of the limiting shaft 32 for guiding the limiting shaft 32 to move toward the limiting section 122 in the sliding section 121. In an embodiment, the track of the sliding section 121 is substantially inclined, and a higher end of the sliding section 121 is located at a side of a lower end of the sliding section 121 close to the rotating shaft 22, so that the sliding section 121 is inclined from bottom to top toward the position where the rotating shaft 22 is located.

The first side wall P7 is an inner side wall of the sliding section 121. The first side wall P7 is disposed along an extending direction of the sliding section 121, and is disposed on a side of the sliding section 121 away from the rotating shaft 22. Thus, when the trim device 100 trims, the second end 312 of the bracket body 31 rotates upward around the rotating shaft 22, so that the first end 311 of the bracket body 31 moves upward relative to the rotating shaft 22, the bracket body 31 also opens relative to the trim bracket 20 under the tension of the torsion spring 23 installed on the rotating shaft 22, and the limiting shaft 32 is forced to open with respect to the trim bracket 20 along with the opening of the bracket body 31, that is, the opening direction of the bracket body 31 relative to the rotating shaft 22 is opposite to the rotating direction of the trim bracket 20 relative to the rotating shaft 22, so that the limiting shaft 32 always has a tendency to abut outward. Under this tendency, the limiting shaft 32 moves toward the first side wall P7 until the limiting shaft 32 abuts against the first side wall P7. The trim device 100 continues to trim, the first end 311 of the bracket body 31 continues to move upward relative to the rotating shaft 22, the limiting shaft 32 slides upward in the sliding section 121 in close contact with the first side wall P7, and the first side wall P7 abuts against the limiting shaft 32 to ensure the stability of the trim device 100 during trimming, making it less likely to shake.

Referring to FIG. 12, FIG. 13, and FIG. 14 again, the sliding section 121 includes a second side wall P8. When the limiting shaft 32 moves away from the unlocking section 123 in the sliding section 121, the second side wall P8 abuts against an outer circumferential surface of the limiting shaft 32 for guiding the limiting shaft 32 to move away from the unlocking section 123 in the sliding section 121. In one embodiment, the second side wall P8 is an inner side wall of the sliding section 121 and is disposed opposite to the first side wall P7. The second side wall P8 is disposed along the extending direction of the sliding section 121, and is disposed at a side of the sliding section 121 close to the rotating shaft 22. Thus, when the trim device 100 is released, the second end 312 of the bracket body 31 rotates downward around the rotating shaft 22, so that the first end 311 of the bracket body 31 moves downward relative to the rotating shaft 22, the bracket body 31 also opens relative to the trim bracket 20 under the tension of the torsion spring 23 installed on the rotating shaft 22, and the limiting shaft 32 is forced to open with respect to the trim bracket 20 along with the opening of the bracket body 31, that is, the opening direction of the bracket body 31 relative to the rotating shaft 22 is opposite to the rotating direction of the trim bracket 20 relative to the rotating shaft 22, so that the limiting shaft 32 always has a tendency to abut outward. Under the tendency, the limiting shaft 32 moves toward the second side wall P8 until the limiting shaft 32 abuts against the second side wall P8. The trim device 100 continues to fall back under the action of its gravity, the first end 311 of the bracket body 31 continues to move downward relative to the rotating shaft 22, the limiting shaft 32 slides downward in the sliding section 121 in close contact with the second side wall P8, and the second side wall P8 abuts against the limiting shaft 32 to ensure the stability of the trim device 100 when it is released, making it less likely to shake.

Figure 15:
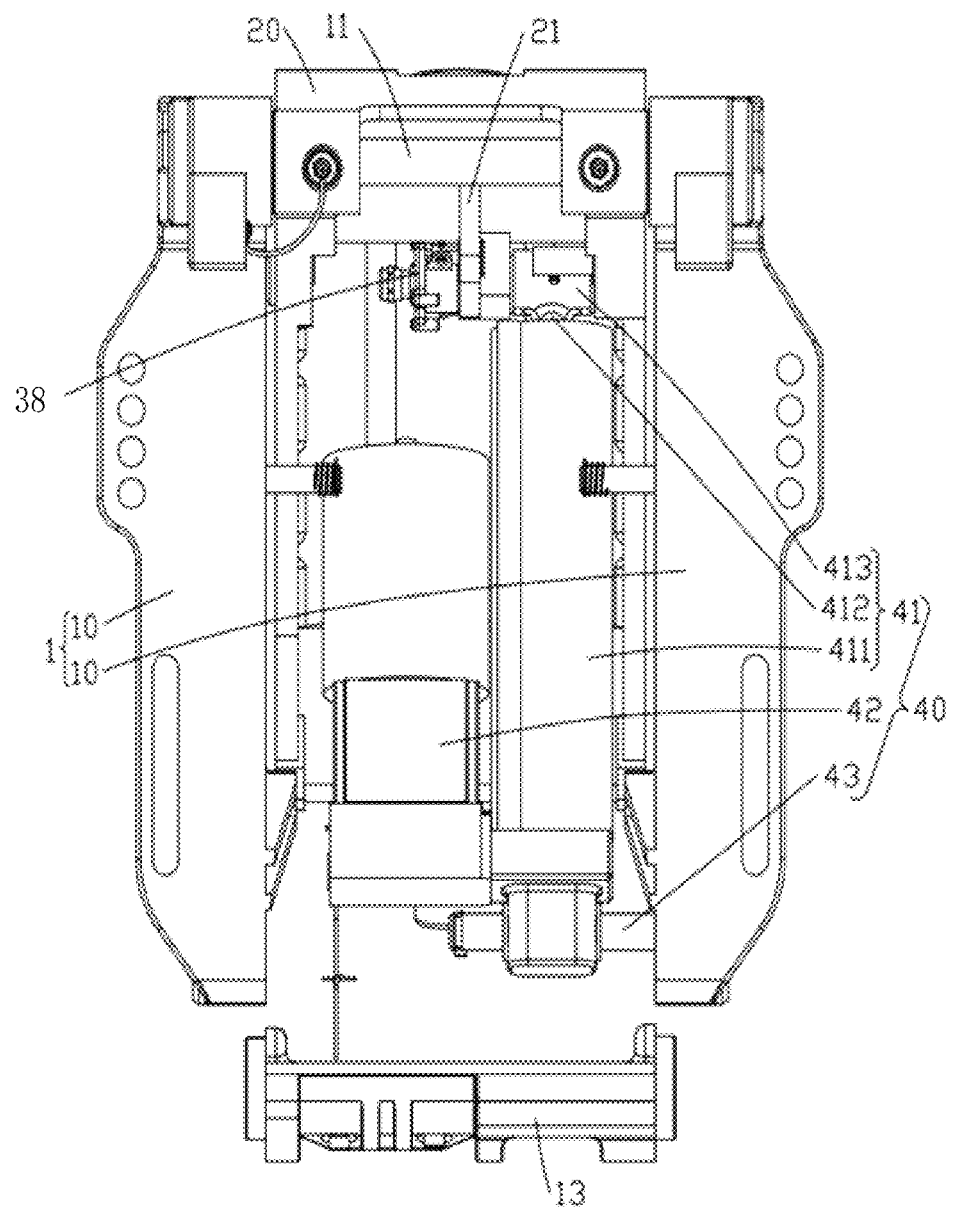
FIG. 15 is a schematic diagram of an explosion of the trim device according to some embodiments of the present disclosure.
Figure 16:
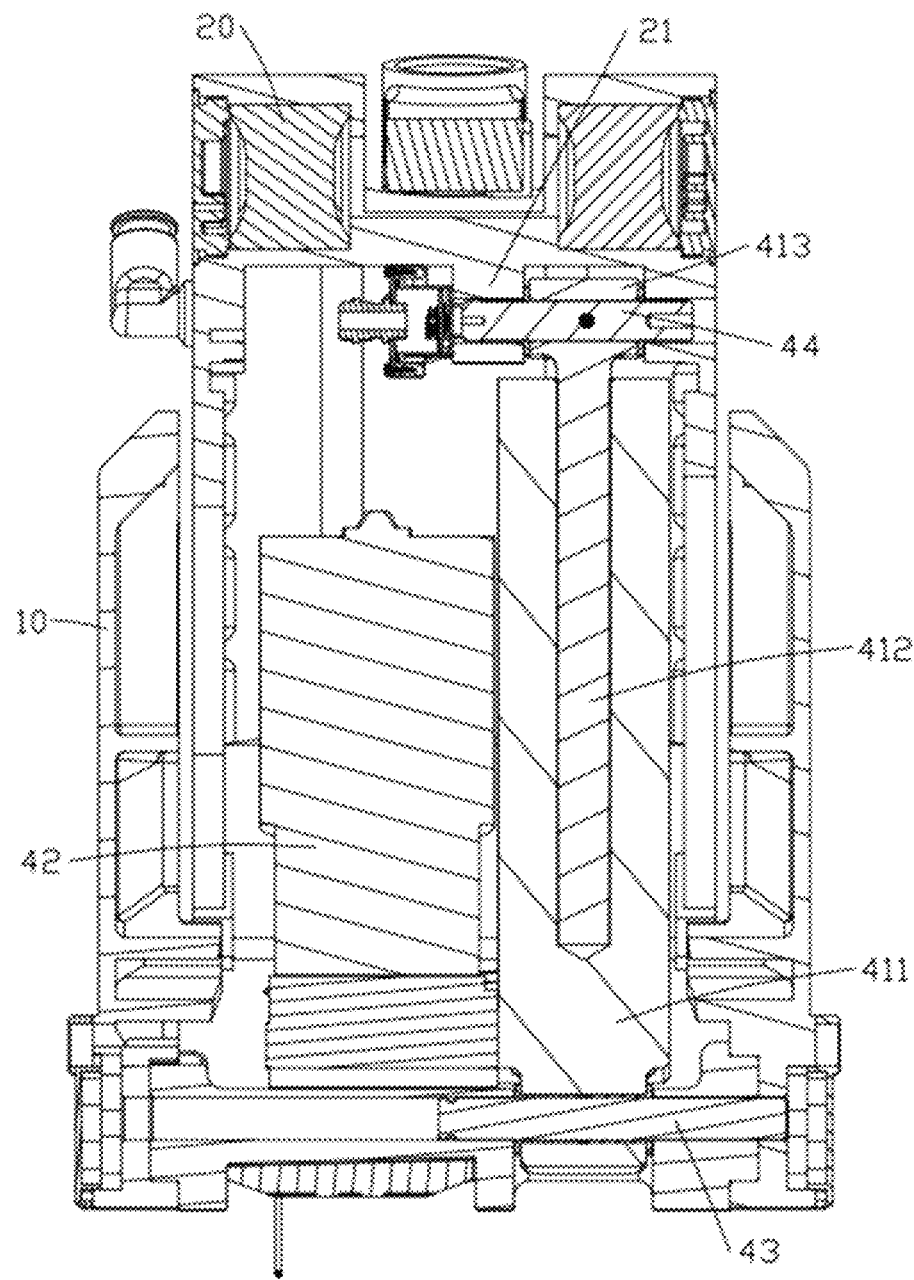
FIG. 16 is a cross-sectional view of the trim device of FIG. 9 taken along plane III-III.
Figure 20:
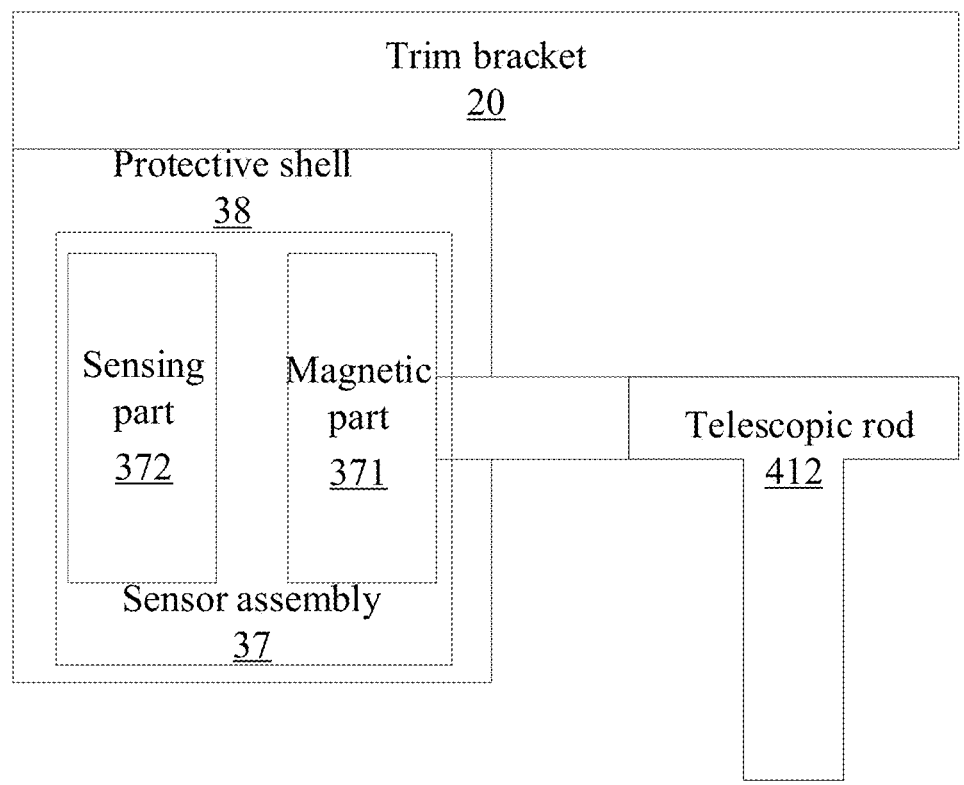
FIG. 20 is a schematic diagram of the positional relationship among the trim bracket, the telescopic rod, and the sensor assembly of the present disclosure.

Referring to FIG. 15, FIG. 16, FIG. 20, and FIG. 21 again, the trim device 100 further includes a driving assembly 40. A fixed end of the driving assembly 40 is rotatably connected to the clamp bracket 1, and an output end of the driving assembly is provided with a telescopic rod 412 which abuts against the clamp bracket 1 and is rotatably matched with the trim bracket 20. The trim device 100 further includes a sensor assembly 37 coupled to the trim bracket 20 and the telescopic rod 412, and configured to sense a relative rotation amount of the telescopic rod 412 and the trim bracket 20. The driving assembly 40 may be communicatively connected to the processor 101, and may be configured to provide power for driving the trim device 100 to trim up in response to the trim-up command output by the processor 101, and may be configured to provide power for driving the trim device 100 to trim down in response to the trim-down command output by the processor 101. In some embodiments, the driving assembly 40 may be a hydraulic cylinder. When the processor 101 receives the trim-up command, the hydraulic cylinder can drive the telescopic rod 412 to gradually extend outwards, and the sensor assembly 37 senses the relative rotation amount of the telescopic rod 412 and the trim bracket 20, so as to determine the trim angle reached when the trim device 100 trims up or trims down.

In one embodiment, a mounting seat 13 is disposed between the two clamping lugs 10. The mounting seat 13 is connected to one end of the clamping lugs 10 away from the trim shaft 11. One end (i.e., the fixed end) of the driving assembly 40 is mounted on the mounting seat 13, and the other end thereof is connected to the trim bracket 20 for providing a driving force to make the trim bracket 20 trim around the trim shaft 11.

Furthermore, the driving assembly 40 includes a trimming bottom shaft 43, a telescopic mechanism 41, and an actuator 42. The trimming bottom shaft 43 is rotatably arranged at the position of the clamp bracket 1 away from the trim shaft 11. One end of the telescopic mechanism 41 is connected to the trimming bottom shaft 43, and the other end of the telescopic mechanism 41 is rotatably abutted against the trim bracket 20. The actuator 42 is connected to the telescopic mechanism 41, and is used for driving the telescopic mechanism 41 to extend and retract. In one embodiment, the axial direction of the trimming bottom shaft 43 is the same as that of the trim shaft 11, one end of the trimming bottom shaft 43 passes through the mounting seat 13 and is rotatably connected to one of the clamping lugs 10, and the other end of the trimming bottom shaft 43 is rotatably mounted in the mounting seat 13. The end of the telescopic mechanism 41 away from the trim shaft 11 is penetrated by the trimming bottom shaft 43, so that the telescopic mechanism 41 can rotate around the axis of the trimming bottom shaft 43. Thereby, the telescopic mechanism 41 can move synchronously when the trim bracket 20 is trimming, so that the telescopic mechanism 41 can always support the trimming bracket 20.

The telescopic mechanism 41 includes a cylinder 411 and a telescopic rod 412. The telescopic rod 412 is telescopically mounted in the cylinder 411. The end portion of the telescopic rod 412 close to the trim shaft 11 is located outside the cylinder 411, and a connecting sleeve 413 for mounting a connecting shaft 44 is provided at the end portion. The connecting shaft 44 is rotatably received in the connecting sleeve 413, the axial direction of the connecting shaft 44 is the same as that of the trim shaft 11, and both ends of the connecting shaft 44 pass through the connecting sleeve 413. One end of the connecting shaft 44 is mounted on the lug plate 21, and the other end of the connecting shaft 44 is mounted on the trim bracket 20, so that when the telescopic mechanism 41 drives the trim bracket 20 to trim, the telescopic mechanism 41 can rotate around the axis of the connecting shaft 44. Thereby, the telescopic mechanism 41 can deflect relative to the trim bracket 20 to cooperate with the trimming action of the trim bracket 20.

The actuator 42 is mounted on the outer side of the telescopic mechanism 41, and can operate synchronously with the telescopic mechanism 41. The actuator 42 is used to adjust the telescopic amount of the telescopic rod 412, and further to adjust the trimming height of the trim bracket 20 lifted by the telescopic rod 412.

In particular, in another embodiment, the driving force may be provided by human power, and the trim bracket 20 is pushed and pulled by human power to drive the trim bracket 20.

Referring to FIG. 16 again, the telescopic mechanism 41 is a hydraulic telescopic mechanism, the actuator 42 is an oil pump motor, and the oil pump motor is used to adjust the amount of oil in the hydraulic telescopic mechanism so as to adjust the telescopic length of the hydraulic telescopic mechanism. In an embodiment, the telescopic mechanism 41 is driven by hydraulic pressure, so that the telescopic mechanism 41 has better stability during operation, and the trim device 100 is not easy to shake during the trimming process. The actuator 42 is pipe-connected to the telescopic mechanism 41, and can exchange hydraulic oil with the telescopic mechanism 41, so that the amount of oil in the cylinder 411 of the telescopic mechanism 41 is controlled by the actuator 42, and the telescopic distance of the telescopic rod 412 of the telescopic mechanism 41 is adjusted.

In some embodiments, referring to FIG. 20 again, the sensor assembly 37 includes a magnetic part 371 and a sensing part 372. The sensing part 372 moves with the trim bracket 20, the magnetic part 371 moves with the telescopic rod 412, and the sensing part 372 senses a magnetic variable of the magnetic part 371. In some embodiments, the trim device 100 further includes a protective shell 38 disposed in the trim bracket 20, the sensing part 372 and the magnetic part 371 are both disposed in the protective shell 38. The sensing part 372 is fixed in the protective shell 38, and the magnetic part 371 is rotatably adapted to the protective shell 38. In some embodiments, the cross section of the trim bracket 20 is substantially L-shaped. The trim bracket 20 includes a first rotating portion and a second rotating portion connected to each other. One end of the first rotating portion, which is far away from the second rotating portion, is sleeved on the trim bottom shaft 43 and is located between the two clamping lugs 10. The above-mentioned driving assembly 40, the sensor assembly 37, the protective shell 38, etc. can be installed inside the trim bracket 20, which is subject to less interference from the outside and is conducive to enhancing the detection accuracy of the sensor assembly 37. In addition, the sensing part 372 and the magnetic part 371 are both installed inside the protective shell 38, which is beneficial to further protecting the sensor assembly 37. In addition, one of the sensing part 372 and the magnetic part 371 moves with the trim bracket 20, and the other moves with the telescopic rod 412, so that the sensing part 372 and the magnetic part 371 do not have relative displacement in the radial direction or the axial direction, which is beneficial to further improving the detection accuracy of the sensor assembly 37.

In the above embodiment, the trim angle of the trim device 100 is obtained by the sensor assembly 37, so as to control the trim device 100 to enter the limit protection mode. However, in some embodiments, the detection accuracy of the sensor assembly 37 may be insufficient due to its own manufacturing process, which further results in a certain error in the detected trim angle. Referring to FIG. 17, in order to reduce the error caused by the insufficient detection accuracy of the sensor assembly 37, the trim device 100 further includes a travel switch 36, and the sensor assembly 37 and the travel switch 36 can be combined to control the trim device 100. The travel switch 36 and the sensor assembly 37 may form a redundant design, and the travel switch 36 may directly detect whether the trim device 100 enters or exits the limit protection mode. For example, when the trim device 100 continues to trim to the limit angle, it can be further determined whether the trim device 100 really enters the limit protection mode based on the output signal of the travel switch 36. For another example, when the trim device 100 trims down to the set angle, it may be further determined whether the trim device 100 is in a state where the normal trimming control can be performed based on the output signal of the travel switch 36. By adding the travel switch 36, on the one hand, the state of the trim device 100 entering or exiting the limit protection mode can be more intuitively indicated, and on the other hand, the redundant design of the travel switch 36 and the sensor assembly 37 can reduce the detection error caused by the insufficient detection accuracy of the sensor assembly 37, thereby improving the detection accuracy of the trim device 100 entering or exiting the limit protection mode. In some embodiments, the limit switch 36 may be disposed on the clamp bracket 1 and/or the limit bracket 30. The processor 101 may be connected to the travel switch 36 to determine the abutment position between the end portion of the limit shaft 32 and the sliding groove 12 based on the output signal of the travel switch 36.

In some embodiments, the travel switch 36 includes a magnetic piece 361 and a sensing piece 362 oppositely disposed. One of the magnetic piece 361 and the sensing piece 362 is disposed on a side of the limit shaft 32 away from the sliding groove 12, and the other of the magnetic piece 361 and the sensing piece 362 is disposed on the bracket body 31. The sensing piece 362 includes a first sensing piece and a second sensing piece. The processor 101 is connected to the sensor piece 362 to determine the abutting position between the end portion of the limit shaft 32 and the sliding groove 12 based on the output signal of the sensor piece 362.

In some embodiments, the magnetic piece 361 is disposed at an end portion of the limit shaft 32 away from the sliding groove 12, the sensing piece 362 is disposed at the bracket body 31, and the magnetic piece 361 slides relative to the sensing piece 362 in a direction parallel to the trim shaft 11 under the driving of the limit shaft 32. In some embodiments, the sensing piece 362 is disposed at an end portion of the limit shaft 32 away from the sliding groove 12, the magnetic piece 361 is disposed at the bracket body 31 and is opposite to the sensing piece 362, and the sensing piece 362 slides relative to the magnetic piece 361 in a direction parallel to the trim shaft 11 under the driving of the limit shaft 32.

In an embodiment, the travel switch 36 may be a Hall sensor, The sensing piece 362 is disposed on the bracket body 31, and the magnetic piece 361 slides relative to the sensing piece 362 in a direction parallel to the trim shaft 11 under the driving of the limit shaft 32. The Hall sensor includes a magnet 361a (i.e., the magnetic piece 361) and two Hall chips 362a (i.e., sensing piece 362). The magnet 361a is installed at one end of the limit shaft 32 away from the sliding groove 12, the two Hall chips 362a are installed on the bracket body 31, and the two Hall chips 362a are arranged at intervals. The spaced arrangement of the two Hall chips 362a can provide a space for the electronic devices on the Hall chip 362a, which can avoid the problem that the two Hall chips 362a are close to each other and the electronic devices are damaged due to extrusion. The relative position of the Hall chip 362a and the magnet 361a in the axial direction of the magnet 361a is fixed, and the angle detection accuracy is not affected by the installation.

Figure 18:
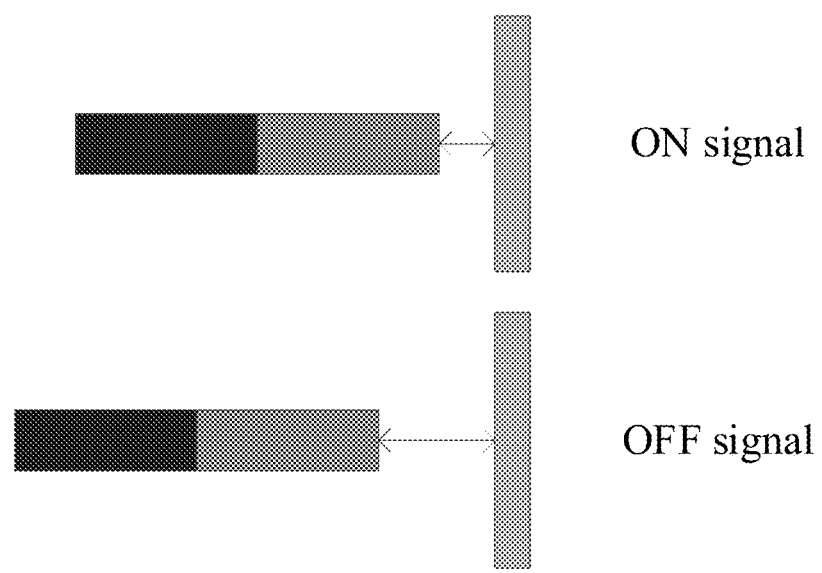
FIG. 18 is a schematic diagram of an output signal of a single hall sensor.
Figure 19:
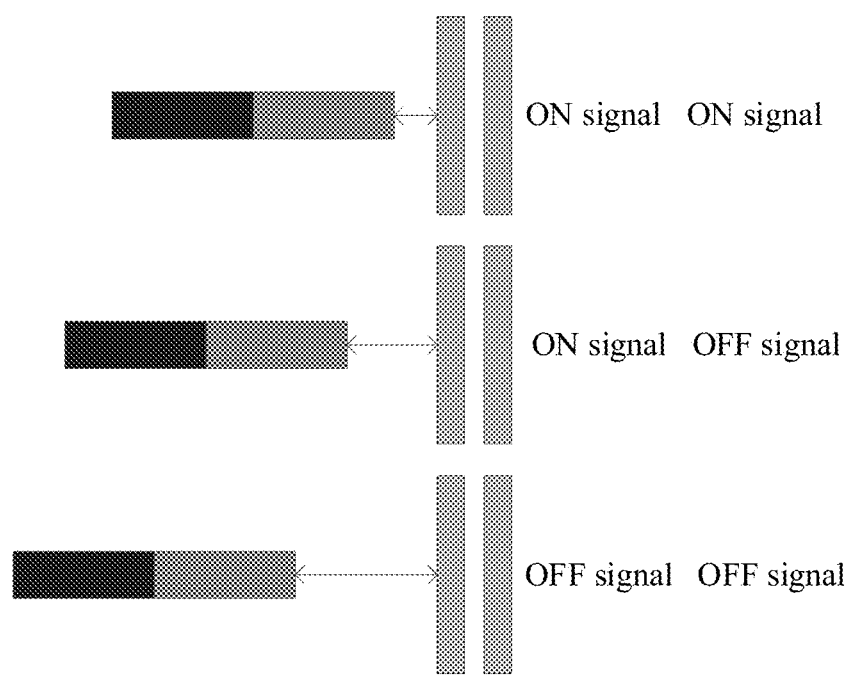
FIG. 19 is a schematic diagram of the output signals of two hall sensors of the present disclosure.

As shown in FIG. 18, the Hall sensor generally includes a magnet 361a and a Hall chip 362a. When the distance between the magnet 361a and the Hall chip 362a is different, the magnetic field sensed by the Hall chip 362a is different, and two different electrical signals of ON and OFF are output accordingly. In the example shown in FIG. 18, the Hall chip 362a outputs an ON signal when the distance between the magnet 361a and the Hall chip 362a is short, and the Hall chip 362a outputs an OFF signal when the distance between the magnet 361a and the Hall chip 362a is long. In another example, the Hall chip 362a may output the ON signal when the distance between the magnet 361a and the Hall chip 362a is long, and the Hall chip 362a may output the OFF signal when the distance between the magnet 361a and the Hall chip 362a is short. The Hall sensor shown in FIG. 18 is only applicable to the detection of two types of distances. Since the present disclosure relates to the detection of three positions, which corresponds to the detection of three kinds of distances, as shown in FIG. 19, the present disclosure provides two Hall chips 362a. When the limit shaft 32 slides left and right, the distance between the magnet 361a and the Hall chip 362a changes, the magnetic field sensed by the Hall chip 362a changes, and the Hall chip 362a outputs different electrical signals. Since the groove depth is different in different sections of the sliding groove 12, the distance between the magnet 361a and the two Hall chips 362a is also different when the limit shaft 32 is in different sections, so that whether the trim device 100 enters or exits the limit protection mode can be determined based on the electrical signals output by the two Hall chips 362a. As shown in FIG. 19, when the electrical signals output by the two Hall chips 362a are ON and ON respectively, it indicates that the limit shaft 32 is in the sliding section 121; when the electrical signals output by the two Hall chips 362a are ON and OFF respectively, it indicates that the limit shaft 32 is in the limit section 122; when the electrical signals output by the two Hall chips 362a are OFF and OFF respectively, it indicates that the limit shaft 32 is in the unlocking section 123. In another example, when the electrical signals output by the two Hall chips 362a are OFF and OFF respectively, it indicates that the limit shaft 32 is in the sliding segment 121; when the electrical signals output by the two Hall chips 362a are OFF and ON respectively, it indicates that the limit shaft 32 is in the limit segment 122; when the electrical signals output by the two Hall chips 362a are ON and ON respectively, it indicates that the limit shaft 32 is in the unlocking section 123.

Accordingly, the present disclosure further provides a computer-readable storage medium storing a computer program, which can be executed by the processor 101 (as shown in FIG. 21) to implement the control method of the trim device 100 (as shown in FIG. 7) according to any of the foregoing method embodiments. For example, the computer-readable storage medium may be phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, digital versatile disks (DVD) or other optical storage, magnetic cassettes, magnetic disk storage or other magnetic storage devices, or any other non-transmission medium that can be used to store information that can be accessed by a computing device.

The foregoing describes specific embodiments of the present disclosure. Other embodiments are within the scope of the appended claims. In some cases, the acts or steps recited in the claims may be performed in a different order than in the embodiments and still achieve desirable results. In addition, the processes depicted in the figures do not necessarily require the particular order shown or the sequential order to achieve desirable results. Multitasking and parallel processing are also possible or may be advantageous in some embodiments.

The above description is only the preferred embodiments of the present disclosure, and is not intended to limit the present disclosure. Any modification, equivalent substitution, improvement, etc. within the spirit and principle of the present disclosure shall be included in the scope of protection of the present disclosure.

What is claimed is:

1. A method for controlling a trim device, comprising:
controlling the trim device to trim up and obtaining a trim angle of the trim device when continuously receiving a trim-up command; and
when the trim angle reaches an entry angle, maintaining a trim-up state of the trim device even when not receiving the trim-up command continuously until the trim angle reaches a limit angle, wherein the limit angle is greater than the entry angle, and the trim device is in a limit protection mode when the trim angle reaches the limit angle.

2. The method of claim 1, wherein the entry angle is determined based on an angle at which the trim device enters the limit protection mode and a first preset angle margin, and the entry angle is smaller than the angle at which the trim device enters the limit protection mode.

3. The method of claim 2, wherein the limit angle is determined based on the angle at which the trim device enters the limit protection mode and a second preset angle margin, and the limit angle is greater than the angle at which the trim device enters the limit protection mode.

4. The method of claim 1, further comprising:
detecting whether the trim-up command is continuously received when the trim angle reaches the entry angle; and
executing the maintaining the trim-up state of the trim device until the trim angle reaches the limit angle when no further trim-up command is received.

5. The method of claim 4, further comprising:
obtaining the trim angle of the trim device when the trim-up command stops being received; and
controlling the trim device to execute a corresponding trim action to make the trim device enter the limit protection mode again when the trim angle is between the exit angle and the ultimate angle, wherein the exit angle is greater than the limit angle, the trim device starts to exit the limit protection mode when the trim angle reaches the exit angle, and the ultimate angle is the maximum trim-up angle of the trim device,
wherein the controlling the trim device to execute a corresponding trim action further comprises:
controlling the trim device to trim down and trim up in sequence when the difference between the trim angle and the ultimate angle is less than a preset difference; and
controlling the trim device to trim up, trim down, and trim up in sequence when the difference between the trim angle and the ultimate angle is greater than a preset difference.

6. The method of claim 1, further comprising:
blocking a first command whose priority is not higher than that of the trim-up command; or
when the trim angle reaches the entry angle and does not reach the limit angle, controlling the trim device to stop trimming up and execute a second command when receiving the second command whose priority is higher than that of the trim-up command during the period.

7. The method of claim 1, further comprising:
when the trim device is in the limit protection mode, controlling the trim device to trim up and obtain the trim angle of the trim device when receiving a trim-down command during the period;
controlling the trim device to trim down after detecting that the trim device trims up to a set state; and
controlling the trim device to stop trimming when the trim angle of the trim device in a trim-down duration reaches a set angle,
wherein when the trim angle of the trim device is less than the set angle, the trim device is in a non-limit protection mode.

8. The method of claim 7, wherein when the trim device is in the limit protection mode, the controlling the trim device to trim up and obtain the trim angle of the trim device when receiving a trim-down command during the period further comprises:
when the trim device is in the limit protection mode, controlling the trim device to trim up and obtain the trim angle when the trim-down command is received and the duration of the trim-down command exceeds a first set duration during the period.

9. The method of claim 7, further comprising:
blocking a first command whose priority is not higher than that of the trim-down command during the period when the trim device trims based on the trim-down command; or
when the trim device trims based on the trim-down command, controlling the trim device to stop trimming and execute a second command when receiving the second command whose priority is higher than that of the trim-down command during the period.

10. A trim device, wherein the trim device comprises:
a processor; and
a memory, wherein the memory is configured to store a program, and the program is executed by the processor to realize a method for controlling the trim device, wherein the method comprises:
controlling the trim device to trim up and obtaining a trim angle of the trim device when continuously receiving a trim-up command; and
when the trim angle reaches an entry angle, maintaining a trim-up state of the trim device even when not receiving the trim-up command continuously until the trim angle reaches a limit angle, wherein the limit angle is greater than the entry angle, and the trim device is in a limit protection mode when the trim angle reaches the limit angle.

11. The trim device of claim 10, further comprising:
a clamp bracket provided with a trim shaft and a sliding groove, the sliding groove comprising a sliding section, a limiting section, and an unlocking section, the groove depth of the sliding section being smaller than that of the limiting section, and the groove depth of the limiting section being smaller than that of the unlocking section;

a trim bracket connected with the trim shaft, configured to be capable of trimming relative to the clamp bracket, and connected with a main unit; and a limiting bracket comprising a bracket body and a limiting shaft, one end of the bracket body rotatably connected with the trim bracket, the other end of the bracket body connected with the limiting shaft, and the limiting shaft configured to slide relative to the bracket body along the direction parallel to the trim shaft, and the end portion of the limiting shaft further slidably fitted to the sliding groove;

wherein:

one end of the limiting section provided with a latching position, the other end of the limiting section connected to the unlocking section, and the limiting shaft entering the unlocking section after being separated from the latching position under a driving force;

the end portion of the limiting shaft abuts against the sliding section when the trim angle reaches the entry angle; and the end portion of the limiting shaft abuts against the limiting section when the trim angle reaches the limit angle.

12. The trim device of claim 11, wherein when the trim angle reaches the exit angle or the ultimate angle, the end portion of the limiting shaft abuts against the unlocking section.

13. The trim device of claim 11, wherein the limiting section is connected with the unlocking section, a first supporting surface is arranged between the limiting section and the unlocking section, and the first supporting surface is configured to prevent the limiting shaft from entering the limiting section from the unlocking section.

14. The trim device of claim 11, wherein the sliding section is connected with the limiting section, a second supporting surface is arranged between the sliding section and the limiting section, and the second supporting surface is configured to prevent the limiting shaft from entering the sliding section from the limiting section.

15. The trim device of claim 11, wherein the unlocking section comprises a guiding ramp, the unlocking section connects to the sliding section through the guiding ramp, and the guide ramp is configured to guide the limiting shaft to enter the sliding section from the unlocking section.

16. The trim device of claim 11, wherein the limiting bracket further comprises an elastic element, the elastic element is elastically connected between the limiting shaft and the bracket body, and is configured to drive the end surface of the limiting shaft to abut against the bottom wall of the sliding groove.

17. The trim device of claim 11, wherein one end of the limiting section away from the unlocking section is provided with a third supporting surface, and the third supporting surface abuts against the outer peripheral surface of the limiting shaft when the limiting shaft is latched in the limiting section.

18. The trim device of claim 11, wherein the trim device further comprises a travel switch, and the travel switch is arranged on the clamp bracket or the limiting bracket; and wherein the processor is connected to the travel switch to determine the abutting section of the end portion of the limiting shaft and the sliding groove based on the output signal of the travel switch.

19. The trim device of claim 18, wherein the travel switch comprises a magnetic piece and a sensing piece which are oppositely arranged, one of the magnetic piece and the sensing piece is arranged on one side of the limiting shaft far away from the sliding groove, the other one of the magnetic piece and the sensing piece is arranged on the bracket body, and the sensing piece comprises a first sensing element and a second sensing element; and wherein the processor is connected to the sensing piece to determine the abutting section of the end portion of the limiting shaft and the sliding groove based on the output signal of the sensing piece.

20. A water propeller, comprising:

a main unit; and a trim device connected to the main unit, wherein the trim device comprises:

a memory storing computer-readable instructions; and a processor coupled to the memory and configured to execute the computer-readable instructions, wherein the computer-readable instructions, when executed by the processor, cause the processor to perform operations comprising:

controlling the trim device to trim up and obtaining a trim angle of the trim device when continuously receiving a trim-up command; and when the trim angle reaches an entry angle, maintaining a trim-up state of the trim device even when not receiving the trim-up command continuously until the trim angle reaches a limit angle, wherein the limit angle is greater than the entry angle, and the trim device is in a limit protection mode when the trim angle reaches the limit angle.

* * * * *